US012761606B2

(12) United States Patent
Ely et al.

(10) Patent No.: US 12,761,606 B2
(45) Date of Patent: Oct. 13, 2026

(54) TRI-AXIS FORCE SENSOR

(71) Applicant: Apple Inc., Cupertino, CA (US)

(72) Inventors: Colin M. Ely, Sunnyvale, CA (US); Erik G. de Jong, San Francisco, CA (US); Steven P. Cardinali, Campbell, CA (US)

(73) Assignee: APPLE INC., Cupertino, CA (US)

(*) Notice: Subject to any disclaimer, the term of this patent is extended or adjusted under 35 U.S.C. 154(b) by 148 days.

(21) Appl. No.: 18/789,281

(22) Filed: Jul. 30, 2024

(65) Prior Publication Data

US 2024/0393747 A1 Nov. 28, 2024

Related U.S. Application Data

(63) Continuation of application No. 17/187,573, filed on Feb. 26, 2021, now Pat. No. 12,066,795, which is a continuation of application No. 15/879,223, filed on Jan. 24, 2018, now Pat. No. 10,962,935.

(60) Provisional application No. 62/533,994, filed on Jul. 18, 2017.

(51) Int. Cl.
*G04G 21/00* (2010.01)
*G04G 9/00* (2006.01)

(52) U.S. Cl.
CPC ........... *G04G 21/00* (2013.01); *G04G 9/0005* (2013.01)

(58) Field of Classification Search
CPC ............................... G04G 21/00; G04G 9/005
See application file for complete search history.

(56) References Cited

U.S. PATENT DOCUMENTS

| | | | |
|---|---|---|---|
| 2,237,860 | A | 4/1941 | Bolle |
| 2,288,215 | A | 6/1942 | Taubert et al. |
| 2,497,935 | A | 2/1950 | Feurer |
| 2,771,734 | A | 11/1956 | Morf |
| 2,788,236 | A | 4/1957 | Kafowi |
| 2,797,592 | A | 7/1957 | Marrapese |
| 3,040,514 | A | 6/1962 | Dinstman |
| 3,056,030 | A | 9/1962 | Kelchner |
| 3,130,539 | A | 4/1964 | Davis |
| 3,355,873 | A | 12/1967 | Morf |
| 3,362,154 | A | 1/1968 | Perret |

(Continued)

FOREIGN PATENT DOCUMENTS

| | | |
|---|---|---|
| AU | 2017228696 | 10/2017 |
| CH | 1888928 | 1/1937 |

(Continued)

OTHER PUBLICATIONS

Author Unknown, "Desirable Android Wear smartwatch from LG," Gulf News, Dubai, 3 pages, Jan. 30, 2015.

(Continued)

*Primary Examiner* — Edwin A. Leon
*Assistant Examiner* — Jason M Collins
(74) *Attorney, Agent, or Firm* — Brownstein Hyatt Farber Schreck, LLP

(57) ABSTRACT

An input device includes a movable input surface protruding from an electronic device. The input device enables force inputs along three axes relative to the electronic device: first lateral movements, second lateral movements, and axial movements. The input device includes force or displacement sensors which can detect a direction and magnitude of input forces.

20 Claims, 21 Drawing Sheets

(56) References Cited

U.S. PATENT DOCUMENTS 3,410,247 A 11/1968 Dronberger
3,495,398 A 2/1970 Widmer et al.
3,577,876 A 5/1971 Spadini
3,621,649 A 11/1971 Vulcan et al.
3,662,618 A 5/1972 Kroll et al.
3,733,803 A 5/1973 Hiraga
3,937,002 A 2/1976 Haften
4,007,347 A 2/1977 Haber
4,031,341 A 6/1977 Wuthrich et al.
4,037,068 A 7/1977 Gaynor
4,051,665 A 10/1977 Arn
4,077,200 A 3/1978 Schneider
4,133,404 A 1/1979 Griffin
4,170,104 A 10/1979 Yamagata
4,258,096 A 3/1981 LaMarche
4,274,152 A 6/1981 Ikegami
4,287,400 A 9/1981 Kitik
4,289,400 A 9/1981 Kubola et al.
4,311,026 A 1/1982 Ochoa
4,311,990 A 1/1982 Burke
4,324,956 A 4/1982 Sakakino et al.
4,345,119 A 8/1982 Latasiewicz
4,364,674 A 12/1982 Tesch
4,379,642 A 4/1983 Meyrat
4,395,134 A 7/1983 Luce
4,396,298 A 8/1983 Ripley
4,417,824 A 11/1983 Paterson et al.
4,448,199 A 5/1984 Schmid
4,520,306 A 5/1985 Kirby
4,581,509 A 4/1986 Sanford et al.
4,600,316 A 7/1986 Besson
4,617,461 A 10/1986 Subbarao et al.
4,634,861 A 1/1987 Ching et al.
4,641,026 A 2/1987 Garcia, Jr.
4,670,737 A 6/1987 Rilling
4,766,642 A 8/1988 Gaffney et al.
4,783,772 A 11/1988 Umemoto et al.
4,884,073 A 11/1989 Souloumiac
4,914,831 A 4/1990 Kanezashi et al.
4,931,794 A 6/1990 Haag
4,952,799 A 8/1990 Loewen
4,980,685 A 12/1990 Souloumiac et al.
4,987,299 A 1/1991 Kobayashi et al.
5,001,687 A 3/1991 Brien
5,034,602 A 7/1991 Garcia et al.
5,177,355 A 1/1993 Branan
5,214,278 A 5/1993 Banda
5,258,592 A 11/1993 Nishikawa et al.
5,288,993 A 2/1994 Bidiville et al.
5,347,123 A 9/1994 Jackson et al.
5,383,166 A 1/1995 Gallay
5,471,054 A 11/1995 Watanabe
5,477,508 A 12/1995 Will
5,509,174 A 4/1996 Worrell
5,559,761 A 9/1996 Frenkel et al.
5,572,314 A 11/1996 Hyman et al.
5,583,560 A 12/1996 Florin et al.
5,631,881 A 5/1997 Pessey et al.
5,726,645 A 3/1998 Kamon et al.
5,738,104 A 4/1998 Lo
5,748,111 A 5/1998 Bates
5,825,353 A 10/1998 Will
5,841,050 A 11/1998 Clift et al.
5,847,335 A 12/1998 Sugahara et al.
5,867,082 A 2/1999 Van Zeeland
5,943,233 A 8/1999 Ebina
5,953,001 A 9/1999 Challener et al.
5,960,366 A 9/1999 Duwaer et al.
5,963,332 A 10/1999 Feldman et al.
5,999,168 A 12/1999 Rosenberg et al.
6,069,567 A 5/2000 Zawilski
6,128,006 A 10/2000 Rosenberg et al.
6,134,189 A 10/2000 Carrard
6,154,201 A 11/2000 Levin et al.
6,175,679 B1 1/2001 Veligdan et al.
6,203,190 B1 3/2001 Stotz
6,241,684 B1 6/2001 Amano
6,246,050 B1 6/2001 Tullis et al.
6,252,825 B1 6/2001 Perotto
6,304,247 B1 10/2001 Black
6,355,891 B1 3/2002 Ikunami
6,361,502 B1 3/2002 Puolakanaho et al.
6,377,239 B1 4/2002 Isikawa
6,392,640 B1 5/2002 Will
6,396,006 B1 5/2002 Yokoji et al.
6,422,740 B1 7/2002 Leuenberger
6,477,117 B1 11/2002 Narayanaswami et al.
6,502,982 B1 1/2003 Bach et al.
6,525,278 B2 2/2003 Villain et al.
6,556,222 B1 4/2003 Narayanaswami
6,575,618 B1 6/2003 Inoue et al.
6,587,400 B1 7/2003 Line
6,636,197 B1 10/2003 Goldenberg et al.
6,646,635 B2 11/2003 Pogatetz et al.
6,661,438 B1 12/2003 Shiraishi et al.
6,672,758 B2 1/2004 Ehrsam et al.
6,794,992 B1 9/2004 Rogers
6,809,275 B1 10/2004 Cheng et al.
6,834,430 B2 12/2004 Worrell
6,846,998 B2 1/2005 Hasumi et al.
6,882,596 B2 4/2005 Guanter
6,888,076 B2 5/2005 Hetherington
6,896,403 B1 5/2005 Gau
6,909,378 B1 6/2005 Lambrechts et al.
6,914,551 B2 7/2005 Vidal
6,950,695 B2 9/2005 Chen
6,961,099 B2 11/2005 Takano et al.
6,963,039 B1 11/2005 Weng et al.
6,967,903 B2 11/2005 Guanter
6,977,868 B2 12/2005 Brewer et al.
6,982,930 B1 1/2006 Hung
6,985,107 B2 1/2006 Anson
6,987,568 B2 1/2006 Dana
6,998,553 B2 2/2006 Hisamune et al.
7,009,915 B2 3/2006 Brewer et al.
7,016,263 B2 3/2006 Gueissaz et al.
7,021,442 B2 4/2006 Borgerson
7,022,974 B2 4/2006 Igaki et al.
7,031,228 B2 4/2006 Born et al.
7,034,237 B2 4/2006 Ferri et al.
7,081,905 B1 7/2006 Raghunath et al.
7,102,626 B2 9/2006 Denny, III
7,106,307 B2 9/2006 Cok
7,111,365 B1 9/2006 Howie, Jr.
7,113,450 B2 9/2006 Plancon et al.
7,119,289 B2 10/2006 Lacroix
7,135,673 B2 11/2006 Saint Clair
7,145,131 B2 12/2006 Mizuno et al.
7,167,083 B2 1/2007 Giles
7,187,359 B2 3/2007 Numata
7,244,927 B2 7/2007 Huynh
7,255,473 B2 8/2007 Hiranuma et al.
7,265,336 B2 9/2007 Hataguchi et al.
7,274,303 B2 9/2007 Dresti et al.
7,285,738 B2 10/2007 Lavigne et al.
7,286,063 B2 10/2007 Gauthey
7,292,741 B2 11/2007 Ishiyama et al.
7,358,481 B2 4/2008 Yeoh et al.
7,369,308 B2 5/2008 Tsuruta et al.
7,371,745 B2 5/2008 Ebright et al.
7,385,874 B2 6/2008 Vuilleumier
7,404,667 B2 7/2008 Born et al.
7,465,917 B2 12/2008 Chin et al.
7,468,036 B1 12/2008 Rulkov et al.
7,474,592 B2 1/2009 Lyon
7,506,269 B2 3/2009 Lang et al.
7,520,664 B2 4/2009 Wai
7,528,824 B2 5/2009 Kong
7,545,367 B2 6/2009 Sunda et al.
7,557,795 B2 7/2009 Kong et al.
7,591,582 B2 9/2009 Hiranuma et al.
7,593,755 B2 9/2009 Colando et al.
7,605,846 B2 10/2009 Watanabe
7,619,208 B2 11/2009 Masada et al.

(56) References Cited

U.S. PATENT DOCUMENTS 7,634,263 B2 12/2009 Louch et al.
7,646,677 B2 1/2010 Nakamura
7,655,874 B2 2/2010 Akieda
7,682,070 B2 3/2010 Burton
7,708,457 B2 5/2010 Girardin
7,710,456 B2 5/2010 Koshiba et al.
7,732,724 B2 6/2010 Otani et al.
7,761,246 B2 7/2010 Matsui
7,763,819 B2 7/2010 Leda et al.
7,772,507 B2 8/2010 Orr
7,778,115 B2 8/2010 Ruchonnet
7,781,726 B2 8/2010 Matsui et al.
RE41,637 E 9/2010 O'Hara et al.
7,791,587 B2 9/2010 Kosugi
7,791,588 B2 9/2010 Tierling et al.
7,791,597 B2 9/2010 Silverstein et al.
7,822,469 B2 10/2010 Lo
7,856,255 B2 12/2010 Tsuchiya et al.
7,858,583 B2 12/2010 Schmidt et al.
7,865,324 B2 1/2011 Lindberg
7,894,957 B2 2/2011 Carlson
7,920,249 B2 4/2011 Heinks et al.
7,946,758 B2 5/2011 Mooring
8,063,892 B2 11/2011 Shahoian et al.
8,138,488 B2 3/2012 Grot
8,139,035 B2 3/2012 Strawn et al.
8,143,981 B2 3/2012 Washizu et al.
8,167,126 B2 5/2012 Stiehl
8,169,402 B2 5/2012 Shahoian et al.
8,188,989 B2 5/2012 Levin et al.
8,195,313 B1 6/2012 Fadell et al.
8,220,987 B2 7/2012 Kimura et al.
8,229,535 B2 7/2012 Mensinger et al.
8,248,815 B2 8/2012 Yang et al.
8,263,886 B2 9/2012 Lin et al.
8,263,889 B2 9/2012 Takahashi et al.
8,275,327 B2 9/2012 Yi et al.
8,294,670 B2 10/2012 Griffin et al.
8,312,495 B2 11/2012 Vanderhoff
8,318,340 B2 11/2012 Stimits
8,368,677 B2 2/2013 Yamamoto
8,371,745 B2 2/2013 Manni
8,373,661 B2 2/2013 Lan et al.
8,405,618 B2 3/2013 Colgate
8,410,971 B2 4/2013 Friedlander
8,432,368 B2 4/2013 Momeyer et al.
8,439,559 B2 5/2013 Luk et al.
8,441,450 B2 5/2013 Degner et al.
8,446,713 B2 5/2013 Lai
8,456,430 B2 6/2013 Oliver et al.
8,477,118 B2 7/2013 Lan et al.
8,493,190 B2 7/2013 Periquet et al.
8,508,511 B2 8/2013 Tanaka et al.
8,525,777 B2 9/2013 Stavely et al.
8,562,489 B2 10/2013 Burton et al.
8,568,313 B2 10/2013 Sadhu
8,576,044 B2 11/2013 Chapman
8,593,598 B2 11/2013 Chen et al.
8,607,662 B2 12/2013 Huang
8,614,881 B2 12/2013 Yoo
8,624,836 B1 1/2014 Miller et al.
8,666,682 B2 3/2014 LaVigne et al.
8,677,285 B2 3/2014 Tsern et al.
8,704,787 B2 4/2014 Yamamoto
8,711,093 B2 4/2014 Ong et al.
8,717,151 B2 5/2014 Forutanpour et al.
8,724,087 B2 5/2014 Van De Kerkhof et al.
8,730,167 B2 5/2014 Ming et al.
8,735,747 B2 5/2014 Bigand
8,743,088 B2 6/2014 Watanabe
8,783,944 B2 7/2014 Doi
8,797,153 B2 8/2014 Vanhelle et al.
8,804,993 B2 8/2014 Shukla et al.
8,810,514 B2 8/2014 Zhao et al.
8,816,962 B2 8/2014 Obermeyer et al.
8,824,245 B2 9/2014 Lau et al.
8,847,145 B2 9/2014 Masa
8,847,741 B2 9/2014 Birnbaum et al.
8,851,372 B2 10/2014 Zhou
8,859,971 B2 10/2014 Weber
8,860,674 B2 10/2014 Lee et al.
8,863,219 B2 10/2014 Brown et al.
D717,679 S 11/2014 Anderssen
8,878,657 B2 11/2014 Periquet et al.
8,885,856 B2 11/2014 Sacha
8,895,911 B2 11/2014 Takahashi
8,905,631 B2 12/2014 Sakurazawa et al.
8,908,477 B2 12/2014 Peters
8,920,022 B2 12/2014 Ishida et al.
8,922,399 B2 12/2014 Bajaj et al.
8,928,452 B2 1/2015 Kim et al.
8,948,832 B2 2/2015 Hong et al.
8,954,135 B2 2/2015 Yuen et al.
8,975,543 B2 3/2015 Hakemeyer
8,994,827 B2 3/2015 Mistry et al.
9,001,625 B2 4/2015 Essery et al.
9,024,733 B2 5/2015 Wouters
9,028,134 B2 5/2015 Koshoji et al.
9,030,446 B2 5/2015 Mistry et al.
9,034,666 B2 5/2015 Vaganov et al.
9,039,614 B2 5/2015 Yuen et al.
9,041,663 B2 5/2015 Westerman
9,042,971 B2 5/2015 Brumback et al.
9,049,998 B2 6/2015 Brumback et al.
9,052,696 B2 6/2015 Breuillot et al.
9,086,717 B2 7/2015 Meerovitsch
9,086,738 B2 7/2015 Leung et al.
9,091,309 B2 7/2015 Battlogg
9,100,493 B1 8/2015 Zhou
9,101,184 B2 8/2015 Wilson
9,105,413 B2 8/2015 Hiranuma et al.
9,123,483 B2 9/2015 Ferri et al.
9,134,807 B2 9/2015 Shaw et al.
9,141,087 B2 9/2015 Brown et al.
9,176,577 B2 11/2015 Jangaard et al.
9,176,598 B2 11/2015 Sweetser et al.
9,202,372 B2 12/2015 Reams et al.
9,213,409 B2 12/2015 Redelsheimer et al.
9,223,296 B2 12/2015 Yang et al.
9,241,635 B2 1/2016 Yuen et al.
9,244,438 B2 1/2016 Hoover et al.
9,256,209 B2 2/2016 Yang et al.
9,277,156 B2 3/2016 Bennett et al.
9,348,322 B2 5/2016 Fraser et al.
9,350,850 B2 5/2016 Pope et al.
9,367,146 B2 6/2016 Piot
9,386,932 B2 7/2016 Chatterjee et al.
9,426,275 B2 8/2016 Eim et al.
9,430,042 B2 8/2016 Levin
9,437,357 B2 9/2016 Furuki et al.
9,449,770 B2 9/2016 Sanford et al.
9,477,313 B2 10/2016 Mistry et al.
9,501,044 B2 11/2016 Jackson et al.
9,520,100 B2 12/2016 Houjou et al.
9,532,723 B2 1/2017 Kim
9,542,016 B2 1/2017 Armstrong-Muntner
9,545,541 B2 1/2017 Aragones et al.
9,552,023 B2 1/2017 Joo et al.
9,599,964 B2 3/2017 Gracia
9,600,071 B2 3/2017 Rothkopf
9,606,721 B2 3/2017 Park et al.
9,607,505 B2 3/2017 Rothkopf et al.
9,620,312 B2 4/2017 Ely et al.
9,627,163 B2 4/2017 Ely
9,632,318 B2 4/2017 Goto et al.
9,632,537 B2 4/2017 Memering
9,638,587 B2 5/2017 Marquas et al.
9,651,922 B2 5/2017 Hysek et al.
9,659,482 B2 5/2017 Yang et al.
9,680,831 B2 6/2017 Jooste et al.
9,709,956 B1 7/2017 Ely et al.
9,753,436 B2 9/2017 Ely et al.
D800,172 S 10/2017 Akana
9,800,717 B2 10/2017 Ma et al.

(56) References Cited

U.S. PATENT DOCUMENTS

| | | | | |
|---|---|---|---|---|
| 9,836,025 | B2 | 12/2017 | Ely et al. | |
| 9,873,711 | B2 | 1/2018 | Hoover et al. | |
| 9,874,945 | B2 | 1/2018 | Fukumoto | |
| 9,886,006 | B2 | 2/2018 | Ely et al. | |
| 9,891,590 | B2 | 2/2018 | Shim et al. | |
| 9,891,651 | B2 | 2/2018 | Jackson et al. | |
| 9,891,667 | B2 | 2/2018 | Jung et al. | |
| 9,898,032 | B2 | 2/2018 | Hafez et al. | |
| 9,913,591 | B2 | 3/2018 | Lapetina et al. | |
| 9,921,548 | B2 | 3/2018 | Mitani | |
| 9,927,902 | B2 | 3/2018 | Burr et al. | |
| 9,939,923 | B2 | 4/2018 | Sharma | |
| 9,946,297 | B2 | 4/2018 | Nazzaro et al. | |
| 9,952,558 | B2 | 4/2018 | Ely | |
| 9,952,682 | B2 | 4/2018 | Zhang et al. | |
| 9,971,305 | B2 | 5/2018 | Ely et al. | |
| 9,971,405 | B2 | 5/2018 | Salo et al. | |
| 9,971,407 | B2 | 5/2018 | Holenarsipur et al. | |
| 9,979,426 | B2 | 5/2018 | Na et al. | |
| 10,001,817 | B2 | 6/2018 | Zambetti et al. | |
| 10,012,550 | B2 | 7/2018 | Yang | |
| 10,018,966 | B2 | 7/2018 | Ely et al. | |
| 10,019,097 | B2 | 7/2018 | Ely et al. | |
| 10,037,006 | B2 | 7/2018 | Ely | |
| 10,037,081 | B2 | 7/2018 | Grant | |
| 10,048,802 | B2 | 8/2018 | Shedletsky | |
| 10,057,470 | B2 | 8/2018 | Kim et al. | |
| 10,061,399 | B2 | 8/2018 | Bushnell et al. | |
| 10,066,970 | B2 | 9/2018 | Gowreesunker et al. | |
| 10,092,203 | B2 | 10/2018 | Mirov | |
| 10,108,016 | B2 | 10/2018 | Bosveld | |
| 10,114,342 | B2 | 10/2018 | Kim et al. | |
| 10,145,711 | B2 | 12/2018 | Boonsom et al. | |
| 10,175,652 | B2 | 1/2019 | Ely et al. | |
| 10,190,891 | B1 | 1/2019 | Rothkopf et al. | |
| 10,191,455 | B2 | 1/2019 | Shim et al. | |
| 10,203,662 | B1 | 2/2019 | Lin et al. | |
| 10,209,148 | B2 | 2/2019 | Lyon et al. | |
| 10,216,147 | B2 | 2/2019 | Ely et al. | |
| 10,222,755 | B2 | 3/2019 | Coakley et al. | |
| 10,222,756 | B2 | 3/2019 | Ely et al. | |
| 10,222,909 | B2 | 3/2019 | Shedletsky et al. | |
| 10,234,828 | B2 | 3/2019 | Ely et al. | |
| 10,241,593 | B2 | 3/2019 | Chen | |
| 10,274,905 | B2 | 4/2019 | Chung | |
| 10,275,052 | B2 | 4/2019 | Kang | |
| 10,296,125 | B2 * | 5/2019 | Ely | G04C 3/007 |
| 10,331,081 | B2 | 6/2019 | Ely et al. | |
| 10,331,082 | B2 | 6/2019 | Ely et al. | |
| 10,332,111 | B2 | 6/2019 | Mokhasi et al. | |
| 10,353,487 | B2 | 7/2019 | Chung et al. | |
| 10,379,629 | B2 | 8/2019 | Bushnell et al. | |
| 10,386,940 | B2 | 8/2019 | Kim | |
| 10,401,961 | B2 | 9/2019 | Cruz-Hernandez et al. | |
| 10,429,959 | B2 | 10/2019 | Battlogg | |
| 10,444,040 | B2 | 10/2019 | Ruh | |
| 10,474,194 | B1 | 11/2019 | Ell et al. | |
| 10,503,258 | B2 | 12/2019 | Holenarsipur et al. | |
| 10,509,486 | B2 | 12/2019 | Bushnell et al. | |
| 10,524,671 | B2 | 1/2020 | Lamego | |
| 10,534,320 | B2 | 1/2020 | Ferri et al. | |
| 10,534,900 | B2 | 1/2020 | Cheong et al. | |
| 10,551,798 | B1 | 2/2020 | Bushnell et al. | |
| 10,572,053 | B2 | 2/2020 | Ely et al. | |
| 10,579,090 | B2 | 3/2020 | Jackson et al. | |
| 10,593,617 | B2 | 3/2020 | Ashikaga et al. | |
| 10,599,101 | B2 | 3/2020 | Rothkopf et al. | |
| 10,610,157 | B2 | 4/2020 | Pandya et al. | |
| 10,613,685 | B2 | 4/2020 | Shedletsky | |
| 10,627,783 | B2 | 4/2020 | Rothkopf et al. | |
| 10,655,988 | B2 | 5/2020 | Boonsom et al. | |
| 10,664,074 | B2 | 5/2020 | Moussette et al. | |
| 10,732,571 | B2 | 8/2020 | Ely et al. | |
| 10,765,019 | B2 | 9/2020 | Werner | |
| 10,840,041 | B1 | 11/2020 | Harms | |
| 10,845,764 | B2 | 11/2020 | Ely et al. | |
| 10,852,700 | B2 | 12/2020 | Abramov | |
| 10,852,855 | B2 | 12/2020 | Niu | |
| 10,871,385 | B2 | 12/2020 | Kok | |
| 10,884,549 | B2 | 1/2021 | Shedletsky et al. | |
| 10,936,071 | B2 | 3/2021 | Pandya et al. | |
| 10,942,491 | B2 | 3/2021 | Rothkopf | |
| 10,948,880 | B2 | 3/2021 | Ely et al. | |
| 10,955,937 | B2 | 3/2021 | Bushnell et al. | |
| 10,962,930 | B2 | 3/2021 | Ely et al. | |
| 10,962,935 | B1 | 3/2021 | Ely et al. | |
| 10,987,054 | B2 | 4/2021 | Pandya et al. | |
| 11,000,193 | B2 | 5/2021 | Tal et al. | |
| 11,002,572 | B2 | 5/2021 | Boonsom et al. | |
| 11,015,960 | B2 | 5/2021 | Rothkopf et al. | |
| 11,029,831 | B2 | 6/2021 | Block et al. | |
| 11,036,318 | B2 | 6/2021 | Bokma et al. | |
| 11,085,945 | B2 | 8/2021 | Joet | |
| 11,148,292 | B2 | 10/2021 | Bryner et al. | |
| 11,181,863 | B2 | 11/2021 | Ely et al. | |
| 11,194,298 | B2 | 12/2021 | Roach et al. | |
| 11,194,299 | B1 * | 12/2021 | Taylor | G04C 3/001 |
| 11,209,777 | B2 | 12/2021 | Minakuchi et al. | |
| 11,209,783 | B2 | 12/2021 | Bushnell et al. | |
| 11,221,590 | B2 | 1/2022 | Rothkopf et al. | |
| 11,347,189 | B1 | 5/2022 | Herrera et al. | |
| 11,347,351 | B2 | 5/2022 | Shedletsky et al. | |
| 11,350,869 | B2 | 6/2022 | Rasmussen et al. | |
| 11,360,440 | B2 | 6/2022 | Perkins et al. | |
| 11,385,599 | B2 | 7/2022 | Ely et al. | |
| 11,405,573 | B2 | 8/2022 | Matsui et al. | |
| 11,474,483 | B2 | 10/2022 | Rothkopf | |
| 11,486,741 | B2 | 11/2022 | Masa et al. | |
| 11,513,613 | B2 | 11/2022 | Bushnell et al. | |
| 11,531,306 | B2 | 12/2022 | Ely et al. | |
| 11,537,082 | B2 | 12/2022 | Ferri et al. | |
| 11,550,268 | B2 | 1/2023 | Pandya et al. | |
| 11,556,095 | B2 | 1/2023 | Hiemstra et al. | |
| 11,561,515 | B2 | 1/2023 | Beyhs | |
| 11,567,457 | B2 | 1/2023 | Rothkopf et al. | |
| 11,669,205 | B2 | 6/2023 | Shedletsky et al. | |
| 11,720,064 | B2 | 8/2023 | Ely | |
| 11,754,981 | B2 | 9/2023 | Perkins et al. | |
| 11,762,342 | B2 | 9/2023 | Rothkopf et al. | |
| 11,796,961 | B2 * | 10/2023 | Ely | G04G 17/08 |
| 11,815,860 | B2 | 11/2023 | Pandya et al. | |
| 11,860,587 | B2 | 1/2024 | Taylor et al. | |
| 11,906,937 | B2 * | 2/2024 | Beyhs | G04C 3/002 |
| 12,092,996 | B2 | 9/2024 | Herrera et al. | |
| 12,105,480 | B2 | 10/2024 | Perkins et al. | |
| 12,181,840 | B2 | 12/2024 | Ely et al. | |
| 12,259,690 | B2 * | 3/2025 | Pandya | G04C 3/007 |
| 12,276,943 | B2 * | 4/2025 | Ely | G04G 17/06 |
| 12,474,450 | B2 | 11/2025 | Milkov | |
| 12,596,334 | B2 * | 4/2026 | Davis | G04G 21/00 |
| 2002/0101457 | A1 | 8/2002 | Lang | |
| 2003/0174590 | A1 | 9/2003 | Arikawa et al. | |
| 2004/0047244 | A1 | 3/2004 | Iino et al. | |
| 2004/0082414 | A1 | 4/2004 | Knox | |
| 2004/0130971 | A1 | 7/2004 | Ecoffet et al. | |
| 2004/0264301 | A1 | 12/2004 | Howard et al. | |
| 2005/0072912 | A1 | 4/2005 | Mizuno et al. | |
| 2005/0075558 | A1 | 4/2005 | Vecerina et al. | |
| 2005/0088417 | A1 | 4/2005 | Mulligan | |
| 2006/0002653 | A1 | 1/2006 | Grunnet-Jepsen et al. | |
| 2006/0250377 | A1 | 11/2006 | Zadesky et al. | |
| 2007/0013775 | A1 | 1/2007 | Shin | |
| 2007/0050054 | A1 | 3/2007 | Sambandam Guruparan et al. | |
| 2007/0182708 | A1 | 8/2007 | Poupyrev et al. | |
| 2007/0211042 | A1 | 9/2007 | Kim et al. | |
| 2007/0222756 | A1 | 9/2007 | Wu et al. | |
| 2007/0229671 | A1 | 10/2007 | Takeshita et al. | |
| 2007/0242569 | A1 | 10/2007 | Inoue | |
| 2007/0247421 | A1 | 10/2007 | Orsley et al. | |
| 2008/0099666 | A1 | 5/2008 | Masada et al. | |
| 2008/0130914 | A1 | 6/2008 | Cho | |
| 2008/0181059 | A1 | 7/2008 | Wai | |
| 2008/0185272 | A1 | 8/2008 | Otani et al. | |
| 2009/0051649 | A1 | 2/2009 | Rondel | |

(56) References Cited

U.S. PATENT DOCUMENTS

2009/0073119 A1 3/2009 Le et al.
2009/0115748 A1 5/2009 Tanaka et al.
2009/0122656 A1 5/2009 Bonnet et al.
2009/0146975 A1 6/2009 Chang
2009/0152452 A1 6/2009 Lee et al.
2009/0217207 A1 8/2009 Kagermeier et al.
2009/0285443 A1 11/2009 Camp et al.
2009/0312051 A1 12/2009 Hansson et al.
2009/0312655 A1 12/2009 Lo
2010/0033430 A1 2/2010 Kakutani et al.
2010/0053468 A1 3/2010 Havrill
2010/0079225 A1 4/2010 Washizu et al.
2010/0081375 A1 4/2010 Rosenblatt et al.
2010/0149099 A1 6/2010 Elias
2011/0007468 A1 1/2011 Burton et al.
2011/0090148 A1 4/2011 Li et al.
2011/0158057 A1 6/2011 Brewer et al.
2011/0199301 A1 8/2011 Zhao et al.
2011/0242064 A1 10/2011 Ono et al.
2011/0249378 A1 10/2011 Yoo
2011/0270358 A1 11/2011 Davis et al.
2012/0067711 A1 3/2012 Yang
2012/0068857 A1 3/2012 Rothkopf et al.
2012/0075082 A1 3/2012 Rothkopf et al.
2012/0112859 A1 5/2012 Park et al.
2012/0113044 A1 5/2012 Strazisar et al.
2012/0206248 A1 8/2012 Biggs
2012/0272784 A1 11/2012 Bailey et al.
2013/0015338 A1 1/2013 Masa
2013/0037396 A1 2/2013 Yu
2013/0087443 A1 4/2013 Kikuchi
2013/0191220 A1 7/2013 Dent et al.
2013/0235704 A1 9/2013 Grinberg
2013/0261405 A1 10/2013 Lee et al.
2013/0335196 A1 12/2013 Zhang et al.
2014/0009397 A1 1/2014 Gillespie
2014/0045547 A1 2/2014 Singamsetty et al.
2014/0071098 A1 3/2014 You
2014/0073486 A1 3/2014 Ahmed et al.
2014/0132516 A1 5/2014 Tsai et al.
2014/0139422 A1 5/2014 Mistry
2014/0143784 A1 5/2014 Mistry
2014/0197936 A1 7/2014 Biggs et al.
2014/0275852 A1 9/2014 Hong
2014/0340318 A1 11/2014 Stringer et al.
2014/0347289 A1 11/2014 Suh et al.
2014/0368442 A1 12/2014 Vahtola
2014/0375579 A1 12/2014 Fujiwara
2015/0026647 A1 1/2015 Park et al.
2015/0041289 A1 2/2015 Ely et al.
2015/0049059 A1 2/2015 Zadesky et al.
2015/0098309 A1 4/2015 Adams et al.
2015/0124415 A1 5/2015 Goyal et al.
2015/0186609 A1 7/2015 Utter, II
2015/0221460 A1 8/2015 Teplitxky et al.
2015/0293592 A1 10/2015 Cheong
2015/0320346 A1 11/2015 Chen
2015/0338642 A1 11/2015 Sanford
2015/0341031 A1 11/2015 Marquas et al.
2015/0366098 A1 12/2015 Lapetina et al.
2016/0018846 A1 1/2016 Zenoff
2016/0054813 A1 2/2016 Shediwy et al.
2016/0058375 A1 3/2016 Rothkopf et al.
2016/0061636 A1 3/2016 Gowreesunker et al.
2016/0062623 A1 3/2016 Howard et al.
2016/0069713 A1 3/2016 Ruh et al.
2016/0098016 A1 4/2016 Ely et al.
2016/0109861 A1 4/2016 Kim et al.
2016/0116306 A1 4/2016 Ferri et al.
2016/0147432 A1 5/2016 Shi et al.
2016/0170598 A1 6/2016 Zambetti et al.
2016/0170608 A1 6/2016 Zambetti et al.
2016/0170624 A1 6/2016 Zambetti et al.
2016/0203710 A1 7/2016 Bataillou et al.
2016/0241688 A1 8/2016 Vossoughi
2016/0253487 A1 9/2016 Sarkar et al.
2016/0306446 A1 10/2016 Chung et al.
2016/0320583 A1 11/2016 Hall, Jr.
2016/0327911 A1 11/2016 Eim et al.
2016/0338642 A1 11/2016 Parara et al.
2016/0378069 A1 12/2016 Rothkopf et al.
2016/0378070 A1 12/2016 Rothkopf et al.
2016/0378071 A1 12/2016 Rothkopf et al.
2017/0011210 A1 1/2017 Cheong et al.
2017/0027461 A1 2/2017 Shin et al.
2017/0031449 A1 2/2017 Karsten et al.
2017/0045958 A1 2/2017 Battlogg et al.
2017/0061863 A1 3/2017 Eguchi
2017/0069443 A1 3/2017 Wang et al.
2017/0069444 A1 3/2017 Wang et al.
2017/0069447 A1 3/2017 Wang et al.
2017/0089735 A1 3/2017 Ruh
2017/0090572 A1 3/2017 Holenarsipur
2017/0090599 A1 3/2017 Kuboyama et al.
2017/0104902 A1 4/2017 Kim et al.
2017/0139489 A1 5/2017 Chen et al.
2017/0216519 A1 8/2017 Vouillamoz
2017/0216668 A1 8/2017 Burton et al.
2017/0238138 A1 8/2017 Aminzade
2017/0251561 A1 8/2017 Fleck et al.
2017/0269715 A1 9/2017 Kim et al.
2017/0285404 A1 10/2017 Kubota et al.
2017/0301314 A1 10/2017 Kim et al.
2017/0307414 A1 10/2017 Ferri et al.
2017/0319082 A1 11/2017 Sayme
2017/0331869 A1 11/2017 Bendahan et al.
2017/0357465 A1 12/2017 Dzeryn et al.
2018/0018026 A1 1/2018 Bushnell et al.
2018/0059624 A1 3/2018 James
2018/0136613 A1 5/2018 Ely et al.
2018/0136686 A1 5/2018 Jackson et al.
2018/0196517 A1 7/2018 Tan et al.
2018/0225701 A1 8/2018 Han
2018/0235491 A1 8/2018 Bayley et al.
2018/0239306 A1 8/2018 Ely
2018/0299834 A1 10/2018 Ely et al.
2018/0307363 A1* 10/2018 Ely ........................ G04C 3/007
2018/0329368 A1 11/2018 Ely et al.
2018/0335891 A1 11/2018 Shedletsky et al.
2018/0337551 A1 11/2018 Park
2018/0341342 A1 11/2018 Bushnell et al.
2018/0364815 A1 12/2018 Moussette et al.
2019/0017846 A1 1/2019 Boonsom et al.
2019/0025940 A1 1/2019 Shim et al.
2019/0056700 A1 2/2019 Matsuno
2019/0072902 A1 3/2019 Ely et al.
2019/0072911 A1 3/2019 Ely et al.
2019/0072912 A1 3/2019 Pandya et al.
2019/0082547 A1 3/2019 Werner et al.
2019/0088583 A1 3/2019 Ashikaga et al.
2019/0146415 A1 5/2019 Ely et al.
2019/0163324 A1 5/2019 Shedletsky
2019/0170541 A1 6/2019 Rothkopf et al.
2019/0250754 A1 8/2019 Ely et al.
2019/0278232 A1 9/2019 Ely et al.
2019/0294117 A1 9/2019 Ely et al.
2019/0302902 A1 10/2019 Bushnell et al.
2019/0317454 A1 10/2019 Holenarsipur et al.
2019/0391539 A1 12/2019 Perkins et al.
2020/0041962 A1 2/2020 Beyhs
2020/0064774 A1 2/2020 Ely et al.
2020/0064779 A1 2/2020 Pandya et al.
2020/0072644 A1 3/2020 Masa
2020/0073339 A1 3/2020 Roach et al.
2020/0085331 A1 3/2020 Chou
2020/0110473 A1 4/2020 Bushnell et al.
2020/0150815 A1 5/2020 Ely et al.
2020/0159172 A1 5/2020 Bushnell et al.
2020/0233380 A1 7/2020 Rothkopf
2020/0233529 A1 7/2020 Shedletsky et al.
2020/0271483 A1 8/2020 Boonsom
2020/0310609 A1 10/2020 Ham
2020/0326659 A1 10/2020 Ely et al.
2021/0006738 A1 1/2021 Matsui et al.

(56) References Cited

U.S. PATENT DOCUMENTS

| | | | |
|---|---|---|---|
| 2021/0055696 | A1 | 2/2021 | Ely |
| 2021/0060783 | A1 | 3/2021 | Bryner et al. |
| 2021/0096688 | A1 | 4/2021 | Shedletsky et al. |
| 2021/0157278 | A1 | 5/2021 | Xue |
| 2021/0181682 | A1 | 6/2021 | Ely et al. |
| 2021/0181688 | A1 | 6/2021 | Ely et al. |
| 2021/0181690 | A1 | 6/2021 | Rothkopf et al. |
| 2021/0181691 | A1 | 6/2021 | Rothkopf et al. |
| 2021/0181692 | A1 | 6/2021 | Rothkopf et al. |
| 2021/0181865 | A1 | 6/2021 | Bushnell et al. |
| 2021/0325168 | A1 | 10/2021 | Lv et al. |
| 2021/0353226 | A1 | 11/2021 | Hiemstra |
| 2021/0373501 | A1 | 12/2021 | Pandya et al. |
| 2021/0405594 | A1 | 12/2021 | Holenarsipur et al. |
| 2022/0043397 | A1 | 2/2022 | Ely et al. |
| 2022/0043402 | A1 | 2/2022 | Roach et al. |
| 2022/0074731 | A1 | 3/2022 | Jang et al. |
| 2022/0075328 | A1 | 3/2022 | Taylor |
| 2022/0171344 | A1 | 6/2022 | Rothkopf et al. |
| 2022/0261111 | A1 | 8/2022 | Shedletsky et al. |
| 2022/0299944 | A1 | 9/2022 | Ely |
| 2022/0326660 | A1 | 10/2022 | Perkins |
| 2022/0413446 | A1 | 12/2022 | Rothkopf et al. |
| 2023/0012897 | A1 | 1/2023 | Bushnell et al. |
| 2023/0013283 | A1 | 1/2023 | Herrera et al. |
| 2023/0028554 | A1 | 1/2023 | Rothkopf et al. |
| 2023/0061926 | A1 | 3/2023 | Milkov |
| 2023/0077241 | A1 | 3/2023 | Pandya et al. |
| 2023/0097827 | A1 | 3/2023 | Rothkopf et al. |
| 2023/0101015 | A1 | 3/2023 | Ely et al. |
| 2023/0161299 | A1 | 5/2023 | Beyhs |
| 2023/0168635 | A1 | 6/2023 | Hiemstra et al. |
| 2023/0213893 | A1 | 7/2023 | Rothkopf et al. |
| 2023/0259235 | A1 | 8/2023 | Shedletsky et al. |
| 2023/0341819 | A1 | 10/2023 | Ely et al. |
| 2023/0393536 | A1 | 12/2023 | Perkins et al. |
| 2023/0400818 | A1 | 12/2023 | Davis et al. |
| 2023/0408984 | A1 | 12/2023 | Liang et al. |
| 2023/0418230 | A1 | 12/2023 | Ely et al. |
| 2024/0036523 | A1 | 2/2024 | Pandya et al. |
| 2024/0045383 | A1 | 2/2024 | Roach et al. |
| 2024/0053707 | A1 | 2/2024 | Ely et al. |
| 2024/0126219 | A1 | 4/2024 | Taylor et al. |
| 2024/0152100 | A1 | 5/2024 | Beyhs |
| 2024/0192804 | A1 | 6/2024 | Shedletsky et al. |
| 2024/0264568 | A1 | 8/2024 | Ely |
| 2024/0264569 | A1 | 8/2024 | Davis et al. |
| 2024/0369385 | A1 | 11/2024 | Fisher |
| 2024/0393747 | A1 | 11/2024 | Ely et al. |
| 2025/0004426 | A1 | 1/2025 | Herrera et al. |
| 2025/0013202 | A1 | 1/2025 | Ely et al. |
| 2025/0013207 | A1 | 1/2025 | Perkins et al. |
| 2025/0093818 | A1 | 3/2025 | Ely et al. |
| 2025/0103008 | A1 | 3/2025 | Panya et al. |
| 2025/0109970 | A1 | 4/2025 | Chamakura et al. |
| 2025/0110580 | A1 | 4/2025 | Zhao et al. |
| 2025/0165101 | A1 | 5/2025 | Shedletsky et al. |
| 2025/0189933 | A1 | 6/2025 | Pandya et al. |
| 2025/0231532 | A1 | 7/2025 | Beyhs |
| 2026/0036944 | A1 | 2/2026 | Moorthy et al. |

FOREIGN PATENT DOCUMENTS

| | | | |
|---|---|---|---|
| CH | 715684 | | 6/2020 |
| CN | 1302740 | | 9/2001 |
| CN | 1445627 | | 10/2003 |
| CN | 1504843 | | 6/2004 |
| CN | 1601408 | | 3/2005 |
| CN | 1624427 | | 6/2005 |
| CN | 1792295 | | 6/2006 |
| CN | 1825224 | | 8/2006 |
| CN | 101035148 | | 9/2007 |
| CN | 101201587 | | 6/2008 |
| CN | 201081979 | | 7/2008 |
| CN | 101404928 | | 4/2009 |
| CN | 201262741 | | 6/2009 |
| CN | 101641663 | | 2/2010 |
| CN | 101750958 | | 6/2010 |
| CN | 201638168 | | 11/2010 |
| CN | 101923314 | | 12/2010 |
| CN | 102067070 | | 5/2011 |
| CN | 102216959 | | 10/2011 |
| CN | 202008579 | | 10/2011 |
| CN | 102543534 | | 7/2012 |
| CN | 102590925 | | 7/2012 |
| CN | 102741772 | | 10/2012 |
| CN | 102890443 | | 1/2013 |
| CN | 202710937 | | 1/2013 |
| CN | 103177891 | | 6/2013 |
| CN | 103191557 | | 7/2013 |
| CN | 103253067 | | 8/2013 |
| CN | 103645804 | | 3/2014 |
| CN | 203564224 | | 4/2014 |
| CN | 103852090 | | 6/2014 |
| CN | 203630524 | | 6/2014 |
| CN | 103919536 | | 7/2014 |
| CN | 103956006 | | 7/2014 |
| CN | 203693601 | | 7/2014 |
| CN | 203705837 | | 7/2014 |
| CN | 203732900 | | 7/2014 |
| CN | 103995456 | | 8/2014 |
| CN | 104020660 | | 9/2014 |
| CN | 203941395 | | 11/2014 |
| CN | 104777987 | | 4/2015 |
| CN | 104685794 | | 6/2015 |
| CN | 204479929 | | 7/2015 |
| CN | 204496177 | | 7/2015 |
| CN | 104880937 | | 9/2015 |
| CN | 104898406 | | 9/2015 |
| CN | 204650147 | | 9/2015 |
| CN | 105022947 | | 11/2015 |
| CN | 105096979 | | 11/2015 |
| CN | 105339871 | | 2/2016 |
| CN | 205121417 | | 3/2016 |
| CN | 105547146 | | 5/2016 |
| CN | 105556433 | | 5/2016 |
| CN | 105683876 | | 6/2016 |
| CN | 105683877 | | 6/2016 |
| CN | 105760067 | | 7/2016 |
| CN | 105955519 | | 9/2016 |
| CN | 205645648 | | 10/2016 |
| CN | 205721636 | | 11/2016 |
| CN | 205750744 | | 11/2016 |
| CN | 106236051 | | 12/2016 |
| CN | 106557218 | | 4/2017 |
| CN | 206147524 | | 5/2017 |
| CN | 206209589 | | 5/2017 |
| CN | 107111342 | | 8/2017 |
| CN | 107122088 | | 9/2017 |
| CN | 107966895 | | 4/2018 |
| CN | 109144173 | A | 1/2019 |
| CN | 109389816 | A | 2/2019 |
| CN | 209560397 | | 10/2019 |
| CN | 209625187 | | 11/2019 |
| CN | 110865680 | | 3/2020 |
| CN | 111752138 | | 10/2020 |
| CN | 215494568 | | 1/2022 |
| CN | 114220694 | | 3/2022 |
| CN | 106125968 | | 11/2022 |
| CN | 218675709 | | 3/2023 |
| DE | 2352016 | | 4/1975 |
| DE | 3706194 | | 9/1988 |
| DE | 102008023651 | | 11/2009 |
| DE | 102016215087 | | 3/2017 |
| EP | 0165548 | | 12/1985 |
| EP | 0556155 | | 8/1993 |
| EP | 1345095 | | 9/2003 |
| EP | 1519452 | | 3/2005 |
| EP | 1669724 | | 6/2006 |
| EP | 1832969 | | 9/2007 |
| EP | 2375295 | | 10/2011 |
| EP | 2579186 | | 4/2013 |
| EP | 2720129 | | 4/2014 |
| EP | 2884239 | | 6/2015 |

(56) References Cited

FOREIGN PATENT DOCUMENTS

| | | | |
|---|---|---|---|
| FR | 2030093 | | 10/1970 |
| FR | 2801402 | | 5/2001 |
| GB | 887369 | | 1/1962 |
| GB | 2433211 | | 6/2007 |
| JP | S52151058 | | 12/1977 |
| JP | S52164551 | | 12/1977 |
| JP | S53093067 | | 8/1978 |
| JP | S5478178 | | 6/1979 |
| JP | S54087779 | | 6/1979 |
| JP | S5708582 | | 1/1982 |
| JP | S5734457 | | 2/1982 |
| JP | S60103936 | | 6/1985 |
| JP | S60103937 | | 6/1985 |
| JP | H02285214 | | 11/1990 |
| JP | H04093719 | | 3/1992 |
| JP | H04157319 | | 5/1992 |
| JP | H05087955 | | 4/1993 |
| JP | H05203465 | | 8/1993 |
| JP | H05312595 | | 11/1993 |
| JP | H06050927 | | 12/1994 |
| JP | H06331761 | | 12/1994 |
| JP | H06347293 | | 12/1994 |
| JP | H07116141 | | 5/1995 |
| JP | H08211169 | | 8/1996 |
| JP | H0914941 | | 1/1997 |
| JP | H10161811 | | 6/1998 |
| JP | H11121210 | | 4/1999 |
| JP | H11191508 | | 7/1999 |
| JP | 2000258559 | | 9/2000 |
| JP | 2000316824 | | 11/2000 |
| JP | 2000337892 | | 12/2000 |
| JP | 2001084934 | | 3/2001 |
| JP | 2001167651 | | 6/2001 |
| JP | 2001202178 | | 7/2001 |
| JP | 2001215288 | | 8/2001 |
| JP | 2001289977 | | 10/2001 |
| JP | 2001524206 | | 11/2001 |
| JP | 2002071480 | | 3/2002 |
| JP | 2002165768 | | 6/2002 |
| JP | 2003036144 | | 2/2003 |
| JP | 2003050668 | | 2/2003 |
| JP | 2003151410 | | 5/2003 |
| JP | 2004079410 | | 3/2004 |
| JP | 2004184396 | | 7/2004 |
| JP | 2004028979 | | 11/2004 |
| JP | 2005017011 | | 1/2005 |
| JP | 2005063200 | | 3/2005 |
| JP | 2005099023 | | 4/2005 |
| JP | 2005108630 | | 4/2005 |
| JP | 2006101505 | | 4/2006 |
| JP | 2006164275 | | 6/2006 |
| JP | 3852854 | | 12/2006 |
| JP | 2007101380 | | 4/2007 |
| JP | 2007149620 | | 6/2007 |
| JP | 2007248176 | | 9/2007 |
| JP | 2007285748 | | 11/2007 |
| JP | 2007311153 | | 11/2007 |
| JP | 2008053980 | | 3/2008 |
| JP | 2008122124 | | 5/2008 |
| JP | 2008122377 | | 5/2008 |
| JP | 2008170436 | | 7/2008 |
| JP | 2008235226 | | 10/2008 |
| JP | 2009009382 | | 1/2009 |
| JP | 2009070657 | | 4/2009 |
| JP | 2009519737 | | 5/2009 |
| JP | 2009540399 | | 11/2009 |
| JP | 2010032545 | | 2/2010 |
| JP | 2010515153 | | 5/2010 |
| JP | 2010165001 | | 7/2010 |
| JP | 2010186572 | | 8/2010 |
| JP | 2010243344 | | 10/2010 |
| JP | 2010244797 | | 10/2010 |
| JP | 2011021929 | | 2/2011 |
| JP | 2011165468 | | 8/2011 |
| JP | 2011221659 | | 11/2011 |
| JP | 2012053801 | | 3/2012 |
| JP | 2012221905 | | 11/2012 |
| JP | 2013057516 | | 3/2013 |
| JP | 2013079961 | | 5/2013 |
| JP | 2013524189 | | 6/2013 |
| JP | 3190075 | | 4/2014 |
| JP | 5477393 | | 4/2014 |
| JP | 2014512556 | | 5/2014 |
| JP | 2014112222 | | 6/2014 |
| JP | 2014174031 | | 9/2014 |
| JP | 2016532266 | | 10/2016 |
| JP | 2017219448 | | 12/2017 |
| JP | 2018510451 | | 4/2018 |
| KR | 20010030477 | | 4/2001 |
| KR | 200278568 | | 3/2002 |
| KR | 20030083340 | | 10/2003 |
| KR | 20070011685 | | 1/2007 |
| KR | 20070014247 | | 2/2007 |
| KR | 100754674 | | 9/2007 |
| KR | 20080028935 | | 4/2008 |
| KR | 20080045397 | | 5/2008 |
| KR | 100849684 | | 8/2008 |
| KR | 1020080111563 | | 12/2008 |
| KR | 2020100007563 | | 7/2010 |
| KR | 20110011393 | | 2/2011 |
| KR | 20110012784 | | 2/2011 |
| KR | 20110103761 | | 9/2011 |
| KR | 20110113368 | | 10/2011 |
| KR | 20130036038 | | 4/2013 |
| KR | 20130131873 | | 12/2013 |
| KR | 20140051391 | | 4/2014 |
| KR | 20140064689 | | 5/2014 |
| KR | 20140104388 | | 8/2014 |
| KR | 20160017070 | | 2/2016 |
| KR | 20160048967 | | 5/2016 |
| KR | 20170106395 | | 9/2017 |
| KR | 20170127744 | A | 11/2017 |
| KR | 102136836 | | 7/2020 |
| NL | 1040225 | | 11/2014 |
| RO | 129033 | | 11/2013 |
| TW | 200633681 | | 10/2006 |
| WO | WO2001/022038 | | 3/2001 |
| WO | WO2001/069567 | | 9/2001 |
| WO | WO2003/032538 | | 4/2003 |
| WO | WO2010/058376 | | 5/2010 |
| WO | WO2012/083380 | | 6/2012 |
| WO | WO2012/094805 | | 7/2012 |
| WO | WO2014/018118 | | 1/2014 |
| WO | WO2014/200766 | | 12/2014 |
| WO | WO2015/034149 | | 3/2015 |
| WO | WO2015/116111 | | 8/2015 |
| WO | WO2015/122885 | | 8/2015 |
| WO | WO2015/147756 | | 10/2015 |
| WO | WO2016/080669 | | 5/2016 |
| WO | WO2016/104922 | | 6/2016 |
| WO | WO2016/155761 | | 10/2016 |
| WO | WO2016196171 | | 12/2016 |
| WO | WO2016208835 | | 12/2016 |
| WO | WO2017/013278 | | 1/2017 |
| WO | WO2019/050778 | | 3/2019 |
| WO | WO2020/173085 | | 9/2020 |

OTHER PUBLICATIONS

Author Unknown, “Fossil Q ups smartwatch game with handsome design and build,” Business Mirror, Makati City, Philippines, 3 pages, Dec. 20, 2016.

Author Unknown, “How Vesag Helps Kids Women and Visitors,” http://www.sooperarticles.com/health-fitness-articles/children-health-articles/how-vesag-helps-kids-women-visitors-218542.html, 2 pages, at least as early as May 20, 2015.

Author Unknown, “mHealth,” http://mhealth.vesag.com/?m=201012, 7 pages, Dec. 23, 2010.

Author Unknown, “mHealth Summit 2010,” http://www.virtualpressoffice.com/eventsSubmenu.do?page=exhibitorPage&showId=1551&companyId=5394, 5 pages, Nov. 18, 2010.

(56) References Cited

OTHER PUBLICATIONS

Author Unknown, "MyKronoz ZeTime: World's Most Funded Hybrid Smartwatch Raised over $3M on Kickstarter, Running until Apr. 27," Business Wire, New York, New York, 3 pages, Apr. 21, 2017.
Author Unknown, "RedEye mini Plug-in Universal Remote Adapter for iPhone, iPod touch and iPad," Amazon.com, 4 pages, date unknown.
Author Unknown, "Re iPhone Universal Remote Control—Infrared Remote Control Accessory for iphone and ipod touch," http://www.amazon.com/iPhone-Universal-Remote-Control-Accessory/dp/tech-data/B0038Z4 . . . , 2 pages, at least as early as Jul. 15, 2010.
Author Unknown, "Vesag Wrist Watch for Dementia Care from Vyzin," http://vyasa- kaaranam-ketkadey.blogspot.com/2011/03/vesag-wrist-watch-for-dementia-care.html, 2 pages, Mar. 31, 2011.
Author Unknown, "Vyzin Electronics Private Limited launches Vesag Watch," http://www.virtualpressoffice.com/showJointPage.do?page=jp&showId=1544, 5 pages, Jan. 6, 2011.
Author Unknown, "Vyzin Unveiled Personal Emergency Response System (PERS) with Remote Health Monitoring That Can Be Used for Entire Family," http://www.24-7pressrelease.com/press-release/vyzin-unveiled-personal-emergency-response-system-pers-with-remote-health-monitoring-that-can-be-used-for-entire-family-219317.php, 2 pages, Jun. 17, 2011.
Author Unknown, "DeskThorityNet, Optical Switch Keyboards," http://deskthority.net/keyboards-f2/optical-switch-keyboards-t1474.html, 22 pages, Jul. 11, 2015.
Epstein et al., "Economical, High-Performance Optical Encoders," Hewlett-Packard Journal, pp. 99-106, Oct. 1988. [text only version].
Greyb, "Google Watch: Convert your arm into a keyboard," http://www.whatafuture.com/2014/02/28/google-smartwatch/#sthash.Yk35cDXK.dpbs, 3 pages, Feb. 28, 2014.
IBM, "Additional Functionality Added to Cell Phone via "Learning" Function Button," www.ip.com, 2 pages, Feb. 21, 2007.
Kim, Joseph, "2010 mHealth Summit Emerges as Major One-Stop U.S. Venue for Mobile Health," http://www.medicineandtechnology.com/2010/08/2010-mhealth-summit-emerges-as-major.html, 3 pages, Aug. 26, 2010.
Krishnan et al., "A Miniature Surface Mount Reflective Optical Shaft Encoder," Hewlett-Packard Journal, Article 8, pp. 1-6, Dec. 1996.
Narayanaswami et al., "Challenges and considerations for the design and production of a purpose-optimized body-worn wrist-watch computer," Defense, Security, and Cockpit Displays, 2004.
M.T. Raghunath et al., User Interfaces for Applications on a Wrist Watch, Personal and Ubiquitous Computing, vol. 6, No. 1, 2002, Springer.
Rick, "How Vesag Helps Health Conscious Citizens," http://sensetekgroup.com/2010/11/29/wireless-health-monitoring-system/, 2 pages, Nov. 29, 2010.
Sadhu, Rajendra, "How Vesag Helps People Who Want to 'Be There'?," http://ezinearticles.com/?How-Vesag-Helps-People-Who-Want-to-Be-There?&id-5423873, 1 page, Nov. 22, 2010.
Sadhu, Rajendra, "Mobile Innovation Helps Dementia and Alzheimer's Patients," http://www.itnewsafrica.com/2010/11/mobile-innovation-helps-dementia-andalzheimer%E2%80%99s-patients/, 3 pages, Nov. 22, 2010.
Sherr, Sol, "Input Devices," p. 55, Mar. 1988.
Tran et al., "Universal Programmable Remote Control/Telephone," www.ip.com, 2 pages, May 1, 1992.

* cited by examiner

*FIG. 11A*
1100
Y
X
Z
1106
1102
WOULD
YOU LIKE
DIRECTIONS?
1168

TRI-AXIS FORCE SENSOR

CROSS-REFERENCE TO RELATED APPLICATIONS

This application is a continuation application of U.S. patent application Ser. No. 17/187,573, filed Feb. 26, 2021, and titled "Tri-Axis Force Sensor," which is a continuation of U.S. patent application Ser. No. 15/879,223, filed Jan. 24, 2018, now U.S. Pat. No. 10,962,935, and titled "Tri-Axis Force Sensor," which claims the benefit under 35 U.S.C. 119 (e) of U.S. Provisional Patent Application No. 62/533,994, filed Jul. 18, 2017 and titled "Tri-Axis Force Sensor," the disclosures of which are hereby incorporated by reference herein in their entirety.

FIELD

The described embodiments relate generally to input devices. More particularly, the present embodiments relate to multi-axial pressure input devices, such as a watch crown, coupled to electronic devices.

BACKGROUND

Many devices, such as wearable electronic devices, use various input mechanisms to receive user input. In particular, small form factor devices, such as watches, smart watches, wearable devices, and so on, may have a limited number of input mechanisms.

For example, many watches include a crown or similar input mechanism. Some crowns can be rotated to wind the watch. Other crowns may be translated into a time-changing position whereupon they may be rotated to change the time of the watch.

SUMMARY

The present disclosure relates to an input mechanism, such as a watch crown, that detects applied force along multiple axes. The input mechanism may be included in an electronic device. A user may provide input to the electronic device by applying force axially (e.g., along an axis of rotation of the input mechanism), laterally (e.g., perpendicular to the axis of rotation), or rotationally (e.g., rotating about the axis of rotation). The input mechanism may include two or more force sensors that may be used to determine a magnitude and direction of a force applied to the watch crown. The electronic device may be used to receive a variety of different inputs based on various directions and magnitudes of force applied to the watch crown.

A watch may include a housing, a display at least partially within the housing, a crown, and a processor. The crown includes a stud coupled to, and protruding from, the housing of the watch. A compliant material surrounds at least a portion of the stud, and a crown cap at least partially surrounds the compliant material. A force sensor is positioned within the compliant material, and the processor is coupled to the force sensor. The stud also defines an opening which facilitates an electrical connection between the processor and the force sensor.

In some examples, the force sensor includes a first electrode, a second electrode, and an insulating substrate between the first electrode and the second electrode. The force sensor is configured to detect a movement of the crown cap based on a change in distance between the first electrode and the second electrode.

An input device may include a stud configured to couple to, and protrude from, an electronic device, a compliant material surrounding at least a portion of the stud, and a crown cap at least partially surrounding the compliant material. The crown cap is configured to move relative to the stud. A first sensor is configured to transmit a first signal in response to the movement of the cap relative to the stud, and a second sensor is configured to transmit a second signal in response to the movement of the cap relative to the stud. A processor is coupled to the first sensor and the second sensor, and the processor is configured to correlate the first signal and the second signal to an input.

A method of detecting a force applied to a crown of a watch includes the operation of detecting a movement of the crown relative to the watch in response to application of the force using a first force sensor and a second force sensor. A first force value is determined which correlates to the first force sensor, and a second force value is determined which correlates to the second force sensor. The first force value and the second force value are compared to a stored input profile to determine a direction of an input to the crown.

BRIEF DESCRIPTION OF THE DRAWINGS

The disclosure will be readily understood by the following detailed description in conjunction with the accompanying drawings, wherein like reference numerals designate like elements.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

An electronic device is disclosed herein, which may facilitate interaction with a user. The electronic device may be a wearable device, such as a watch, and may include a touch screen operative to receive inputs from a user. The watch may include a crown as an additional input mechanism capable of receiving multi-directional input from the user. Generally, the crown is coupled to a housing of the watch at a location similar to a traditional mechanical watch.

Figure 2:
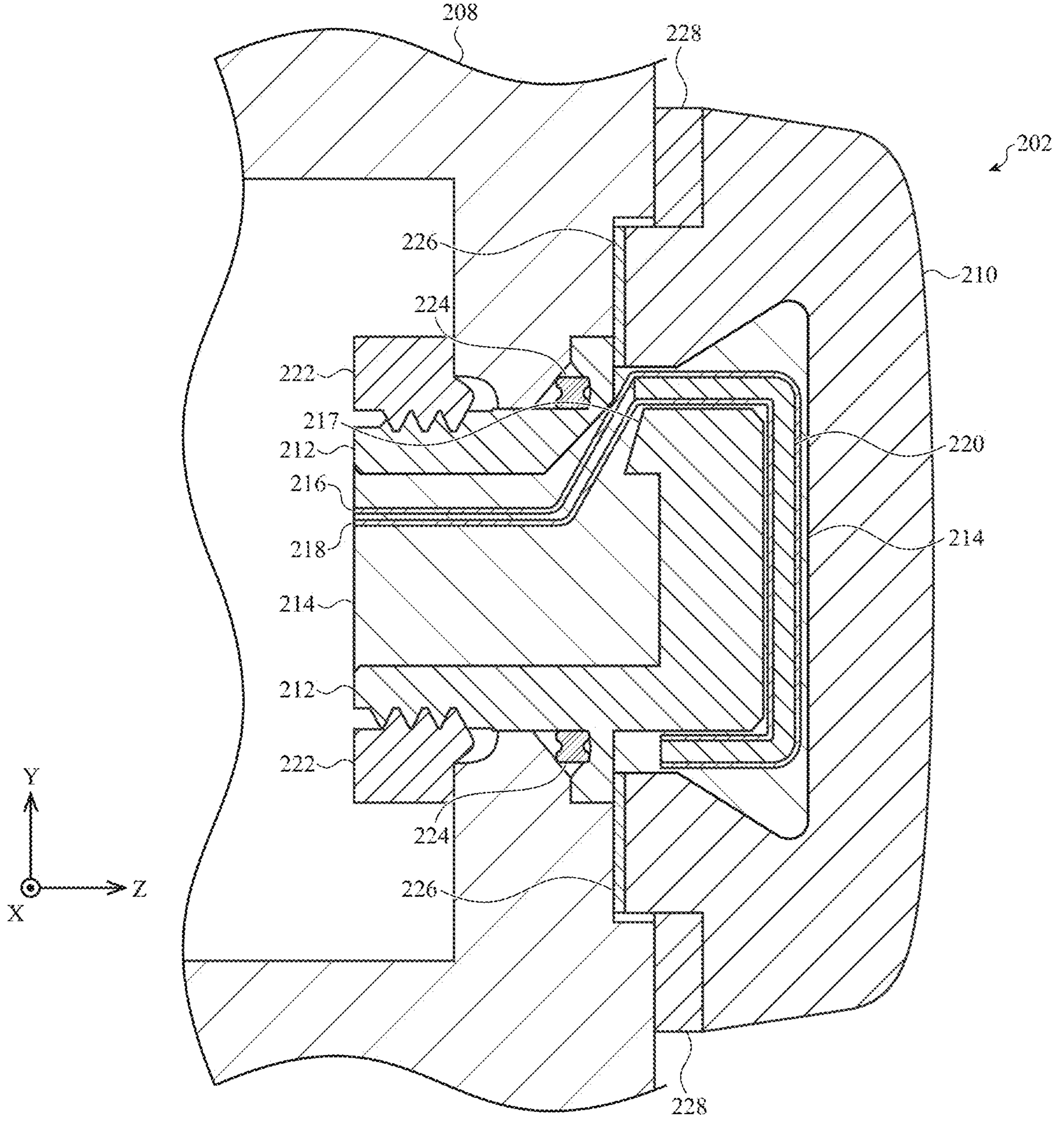
FIG. 2 depicts a cross-section of an example embodiment of a watch crown coupled to the housing of the electronic device of FIG. 1, taken along line A-A of FIG. 1.

The crown may receive force or displacement input from a user along three axes relative to its attachment point on a side of the watch housing when the device is in use: x (e.g., in a first lateral direction, relative to the housing), y (e.g., in a second lateral direction, relative to the housing), and z (e.g., into or out of the housing) (see, e.g., FIG. 2). The crown may receive rotational force or displacement input as well (e.g., rotating about the z axis shown in FIG. 2). Force or displacement sensors may be included within the crown and/or watch housing to detect force inputs. Generally, force inputs to the crown may cause a displacement of the crown (or a portion of the crown), and may accordingly be detected by force or displacement sensors. One or more sensors may enable the watch to distinguish a degree and/or direction of an input to the crown. These or additional sensors may further detect rotational input to the crown.

A traditional watch crown may detect only rotation of the crown as an input. The tri-axial crown of the present disclosure enables additional input to the crown, such as pressing the crown as a button, moving the crown up and down to scroll through options, moving the crown back and forth to adjust a volume or brightness level of the watch, or otherwise changing an indicium (or indicia) on a display of the electronic device. As used herein, an "indicium" is any text, graphic, icon, symbol, or the like, Sample indicia include application icons, volume indicators, brightness indicators, data shown in a list, power indicators, words, numbers, and so on. "Indicia" is the plural of "indicium."

In some embodiments, these additional inputs may further enable intelligent processing of detected forces applied to the crown. For example, a motion of a wearer's wrist may be falsely detected as a deliberate crown input (e.g., a press). A processor in communication with the crown may determine such motion is unintentional. Accordingly, the processor may reject (or ignore) the detected force, rather than processing it as an input to the device.

An example tri-axial watch crown may include a stud or shaft which attaches to, and protrudes outward from, the housing. A crown cap may be attached to the stud in order to provide a surface through which a user interacts with the crown. A compliant material may be disposed between the crown cap and the stud, facilitating motion of the cap relative to the stud in the x, y, and z directions.

A force or displacement sensor may be placed within, or in contact with, the compliant material. Thus, if a user presses on the crown cap, the compliant material may be compressed or otherwise deformed, causing the sensor to detect a motion of the crown cap relative to the stud. The sensor may include a series of displacement or force sensors arranged within the compliant material in such a way as to allow a processing unit to distinguish motions along the x-, y- and z-axes, or any combination thereof. The processing unit may additionally correlate the detected forces to an input to the electronic device.

In other examples, the compliant material may be omitted and/or the sensors may be in different locations. For example, a shaft may pass into the housing. Sensors may be arranged around the shaft and within the housing such that the sensors may detect motion of the shaft relative to the housing.

In many embodiments, the crown may be rotatable. Rotation of the crown may be detectable by the same or additional sensors as those which detect force applied to the crown. For example, the crown may include a shaft which may rotate relative to the housing of the watch. Sensors may detect this rotation of the shaft relative to the housing. In other examples, the crown may include a stud rigidly attached to the housing and a crown cap may rotate around the stud. Sensors within the crown cap and/or stud may detect the rotation of the crown cap.

In still other examples, the crown cap or shaft may only partially rotate. For example, a compliant material between a stud and a watch crown may facilitate less than complete rotation of the crown relative to the stud. The rotation may compress the compliant material, and force sensors may detect a rotational force. The degree of rotation may be determined based on the amount of force detected by the force sensors.

These and other embodiments are discussed below with reference to FIGS. 1-9. However, those skilled in the art will readily appreciate that the detailed description given herein with respect to these figures is for explanatory purposes only and should not be construed as limiting.

Figure 1:
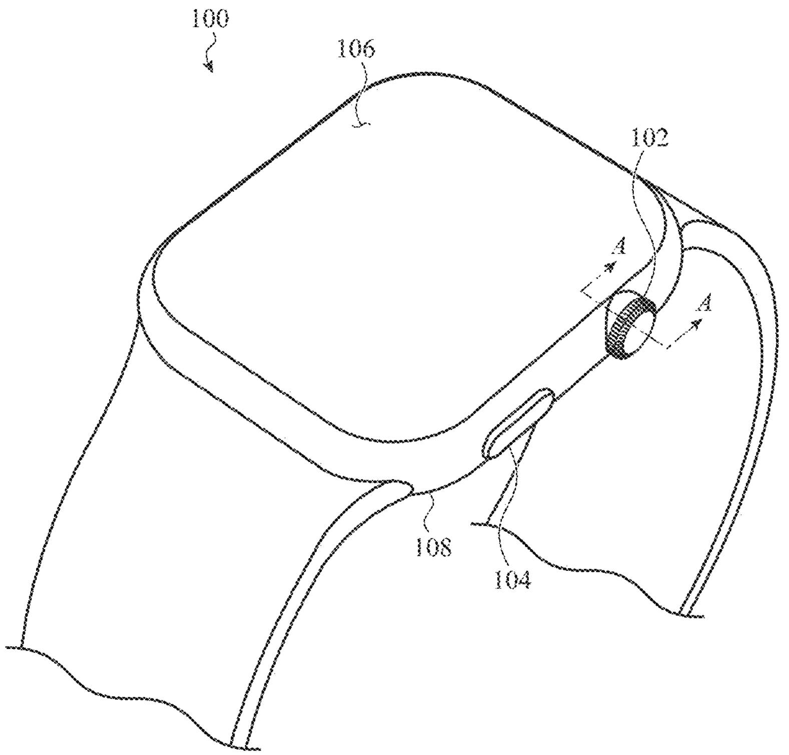
FIG. 1 depicts an electronic device in the form of an electronic watch, incorporating an example watch crown according to the present disclosure.

FIG. 1 depicts an electronic device in the form of a touch-enabled watch, incorporating an example watch crown according to the present disclosure. The electronic device 100 includes a housing 108 surrounding a touch-enabled display 106. The display 106 may be configured to display indicia to a user and receive touch inputs. The electronic device may be operable to receive additional input from a user, such as through a button 104.

The electronic device 100 may also be operable to perform various actions in response to input received via a watch crown 102 or similar input structure. The watch crown 102 may receive inputs along three axes, such that it may move laterally with respect to the housing 108 in multiple directions, axially with respect to the housing (e.g., toward or away from the housing), and/or rotationally. In some embodiments, the watch crown 102 may further receive rotational inputs. Example embodiments of the watch crown 102 and its operation are further described below with respect to FIGS. 2-8.

The electronic device 100 may detect and distinguish various directional force inputs to the watch crown 102. The electronic device 100 may further detect, estimate, or otherwise measure an amount of the force applied to the watch crown 102. The electronic device 100 may include a processing unit, a memory, and other components, such as described with respect to FIG. 9, to facilitate detecting, processing and responding to inputs received by the watch crown 102.

A compressible seal or structure (examples of which are shown in FIGS. 2 and 6-8) may be positioned between the watch crown 102 and the housing 108 and resist passage of contaminants into internal portions of the watch crown 102 and/or the electronic device 100. Portions of the compressible seal may collapse and/or bend to allow translational movement of the watch crown 102. The compressible seal may be configured to obscure and/or otherwise block from view internal components of the watch crown 102 and/or the electronic device 100. Such a configuration may further allow use of internal components formed of different materials and/or with different surfaces than the housing 108 and/or external portions of the watch crown 102 while preventing the internal components from being visible from outside the housing 108.

The electronic device 100 is shown in FIG. 1 as a wearable electronic device having a touch-enabled display 106. However, it is understood that this is an example. In various implementations, the electronic device may be any kind of electronic device that utilizes a tri-axial input mechanism such as the watch crown 102. Sample electronic devices include a laptop computer, a desktop computer, a mobile computer, a smart phone, a tablet computer, a fitness monitor, a personal media player, a display, audiovisual equipment, and so on.

FIG. 2 depicts a cross-section of an example embodiment of a watch crown coupled to the housing of the electronic device of FIG. 1, taken along line A-A of FIG. 1. The watch crown 202 may be an input device which includes a stud 212 (e.g., a shaft) which couples to the housing 208 of the electronic device. The stud 212 also protrudes outward from the housing 208. In some embodiments, the stud 212 is formed from a rigid material, such as metal (e.g., aluminum, steel, copper, brass, etc.), plastic, glass, acrylic, ceramic, composites, other materials, or combinations of materials.

The stud 212 may couple to a crown cap 210 (e.g., a cap). The crown cap 210 may provide an input surface for user interaction. For example, the watch crown 202 may displace in three directions: along the x-axis; along the y-axis; and along an axis of rotation defined by the z-axis. Displacement along the x or y axes is referred to as "lateral movement," insofar as the watch crown 202 moves laterally with respect to the housing 208. Displacement along the z axis is referred to as "axial movement," encompassing the watch crown 202 moving toward or away from the housing 208. In some embodiments, the watch crown 202 may further receive rotational inputs via the crown cap 210.

The watch crown 202 may further include a sensor to detect and distinguish forces applied to the crown cap 210 and/or displacement of the crown cap 210 relative to the stud 212. For example, one or more capacitive force sensors may be formed using an insulating substrate 220 between a flexible drive circuit 216 and a parallel flexible sense circuit 218. In certain embodiments, the flexible drive circuit 216 is coupled to a surface of the insulating substrate 220, and the flexible sense circuit 218 is coupled to an opposite surface of the insulating substrate 220. An electrode may be formed in the flexible drive circuit 216 with a matching electrode formed in the flexible sense circuit 218. A capacitance may be formed across the matched pair of electrodes, and as force is applied to the crown cap 210, the insulating substrate 220 between the electrodes may be compressed, resulting in a change in capacitance across the electrodes. A processing unit may determine an amount of force (generally from one or more force values) applied to the crown cap 210 based on this change in capacitance detected by the force sensor.

A "force value" may be an amount of force, or may be a component (such as a vector) of a force input, detected by a force sensor. Typically, an embodiment may contain multiple force sensors, and different force sensors may detect different force values. For example, one force sensor may detect a force value along an x axis, while another force sensor may detect a force value along a y axis, and yet another force sensor may detect a force value along a z axis. The various force values may be analyzed by a processor to determine, estimate, correlate, or otherwise arrive at a force input applied to the watch crown 202, and typically the crown cap 210. Force values may be detected by any suitable force sensor and need not be vectors of a force input, although this can be the case in many embodiments.

The flexible drive circuit 216 and the flexible sense circuit 218 may be formed as a flexible printed circuit board or a similar structure. A flexible printed circuit board may include a flexible substrate formed from a suitable material, such as polyimide or polyethylene terephthalate. The flexible printed circuit board may further include conductive material formed as one or more electrodes and one or more wires, traces, or similar conducting paths. The conductive material may include materials such as silver, copper, gold, constantan, karma, isoelastic materials, indium tin oxide, or any combination thereof.

The insulating substrate 220 may be an electrically insulating substrate, such as a dielectric. The insulating substrate 220 may be formed from a compressible material, such as a compliant foam, a silicone gel, and similar materials. The flexible drive circuit 216 and the flexible sense circuit 218 may be coupled to the insulating substrate 220 through an adhesive (e.g., a pressure sensitive adhesive) or similar technique.

The flexible drive circuit 216 and flexible sense circuit 218 may include multiple sets of electrodes forming multiple force sensors. With two or more force sensors implemented, the processing unit may detect and distinguish between forces applied along the three different axes, as discussed further below with respect to FIGS. 5A-5C.

In certain embodiments, the stud 212 is coupled to the housing 208 by a fastener 222 (e.g., a clip, threaded nut, or similar fastener) which may hold the stud 212 rigid with respect to the housing 208 along the x-, y-, and z-axes. The fastener 222 may encircle the stud 212 and may additionally threadedly engage the stud 212. Generally, the stud 212 is coupled in a manner that prevents rotation about the z-axis.

The flexible drive circuit 216, flexible sense circuit 218, and insulating substrate 220 may be placed between the stud 212 and the crown cap 210, and surrounded by a compliant material 214. The compliant material 214 may facilitate movement of the crown cap 210 relative to the stud 212 under an exerted force, while providing a restoring force to return the crown cap 210 once the force is released. In addition, the compliant material 214 may facilitate compression of the insulating substrate 220, in order to transmit an applied force to the flexible drive circuit 216 and flexible sense circuit 218.

The compliant material 214 may be formed from a suitable material, such as silicone, polyurethane, polyvinylchloride, rubber, fluoroelastomer, another polymer, or similar material. The compliant material 214 may be injection molded to the stud 212 and/or the crown cap 210, or may be bonded to the stud 212 and the crown cap 210 in another suitable manner.

In some embodiments, the watch crown 202 may prevent or reduce entry of water, dust, or other contaminants to the housing 208. Accordingly, a gasket 228 (such as a silicone or a rubber gasket) may be coupled to the crown cap 210 or the housing 208 at the edge of the crown cap 210 to prevent entry of contaminants. A lubricant 226 (e.g., electrical grease, silicone gel, or similar material) may further prevent entry of contaminants to the housing 208. Each of the gasket 228 and the lubricant 226 may allow the crown cap 210 to displace relative to the stud 212, while resisting the entry of contaminants between the housing 208 and the crown cap 210.

Additionally, a pressure seal may be formed between the stud 212 and the housing 208 to further prevent liquid or other contaminants from entering the housing 208. The stud 212 and/or housing 208 may include a depression to house an O-ring 224 (or similar water sealing element) to provide the pressure seal, resisting the entry of liquids or other contaminants even under pressure.

As depicted in FIG. 2, the stud 212 may be at least partially hollow. The hollow portion of the stud 212 may provide a path to route the flexible drive circuit 216 and the flexible sense circuit 218 from the region between the stud 212 and the crown cap 210 to within the housing 208. An opening 217 may be defined in the stud through which the flexible drive circuit 216 and the flexible sense circuit 218 may be routed from the region between the stud 212 and the crown cap 210 to the hollow portion of the stud 212. The opening 217 and the hollow portion of the stud 212 may typically be filled with the same compliant material 214, sealing the crown cap 210 to the stud 212, as well as sealing the hollow portion of the stud 212, which may also prevent or reduce entry of contaminants to the housing.

The opening 217 may facilitate an electrical connection between one or more force sensors and a processing unit within the housing 208. For example, the flexible drive circuit 216 and the flexible sense circuit 218 may include conductive material (e.g., wires, conductive traces) which forms an electrical connection to force sensors. The flexible drive circuit 216 and flexible sense circuit 218 may also be electrically connected to the processing unit (e.g., directly or by connecting to electrical circuitry connecting to the processing unit).

In many embodiments, the opening 217 may be positioned on a side adjacent an end of the stud 212, which may facilitate sealing with the compliant material 214 surrounding the stud 212. In other embodiments, the opening 217 may be positioned differently, such as at the end of the stud 212 of further from the end. The opening 217 may be formed in an appropriate shape, such as a round opening, a rectangular opening, or another geometric shape (including a non-regular geometric shape). The cross-section of the opening 217 may change in size and/or shape along the wall of the stud 212, or it may have a regular size and/or shape. In some examples, more than one opening may be defined in the stud 212 (e.g., to facilitate connection of additional sensors to the processing unit).

Figure 3:
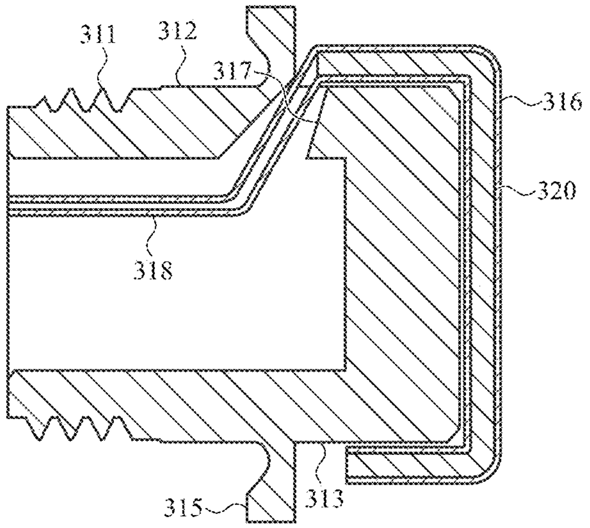
FIG. 3 depicts a sample cross-section of a watch crown, illustrating a stud and a force sensor.

FIG. 3 depicts a partial cross-section of a watch crown (e.g., input device), similar to the depiction in FIG. 2, illustrating only a stud and one or more force sensors, while omitting other components of the watch crown, such as the crown cap 210 and compliant material 214 depicted in FIG. 2. As discussed above with respect to FIG. 2, in some embodiments the stud 312 is rigid, formed from a metal, plastic, ceramic, or similar material. The stud 312 may be formed with a threaded internal portion 311 and a protruding portion 313 separated by a flange 315. The flange 315 may define a depression (e.g., an annular or partial groove) to house an O-ring (such as O-ring 224, depicted in FIG. 2) adjacent the internal portion 311.

The internal portion 311 of the stud 312 may be hollow, to provide a path to route the flexible drive circuit 316 and the flexible sense circuit 318 from the region between the stud 312 and the crown cap to within the housing (e.g., to be electrically coupled to a processing unit or other circuitry). In many embodiments, an opening 317, such as an aperture, is formed through the protruding portion 313 of the stud 312 adjacent the flange 315, through which the flexible drive circuit 316 and the flexible sense circuit 318 may pass from the region between the stud 312 and the crown cap into the hollow internal portion 311 of the stud 312.

The flexible drive circuit 316 and the flexible sense circuit 318 may form multiple force sensing pixels (pairs of capacitive electrodes) around the protruding portion 313 of the stud 312 (such as further depicted below with respect to FIGS. 5A-5C). The flexible drive circuit 316 and/or the flexible sense circuit 318 may be shaped in a C-shape along the protruding portion 313 as depicted, or each may form a ring or partial ring around the protruding portion 313.

In some embodiments, the flexible sense circuit 318 may be coupled to the protruding portion 313 of the stud 312 by an adhesive (e.g., a pressure sensitive adhesive) or similar technique. The stud 312 may accordingly provide a resistive force against compression of the insulating substrate 320 through coupling across the flexible sense circuit 318. In other embodiments, the flexible sense circuit 318 may not be coupled to the stud 312, but the flexible drive circuit 316 and the flexible sense circuit 318 may instead be surrounded (e.g., encompassed) by a compliant material (such as the compliant material 214 depicted in FIG. 2).

Turning to FIGS. 4A-4D, the operation of the flexible drive circuit and the flexible sense circuit is further illustrated as force is applied to the crown cap. FIGS. 4A-4D depict sample cross-sections of the watch crown 402, similar to the depiction in FIG. 2, illustrating the stud 412, the crown cap 410, and one or more force sensors formed by the flexible drive circuit 416 and the flexible sense circuit 418 coupled to the insulating substrate 420. Additional components, such as a compliant material between the crown cap 410 and the stud 412, are omitted for clarity.

Figure 4A:
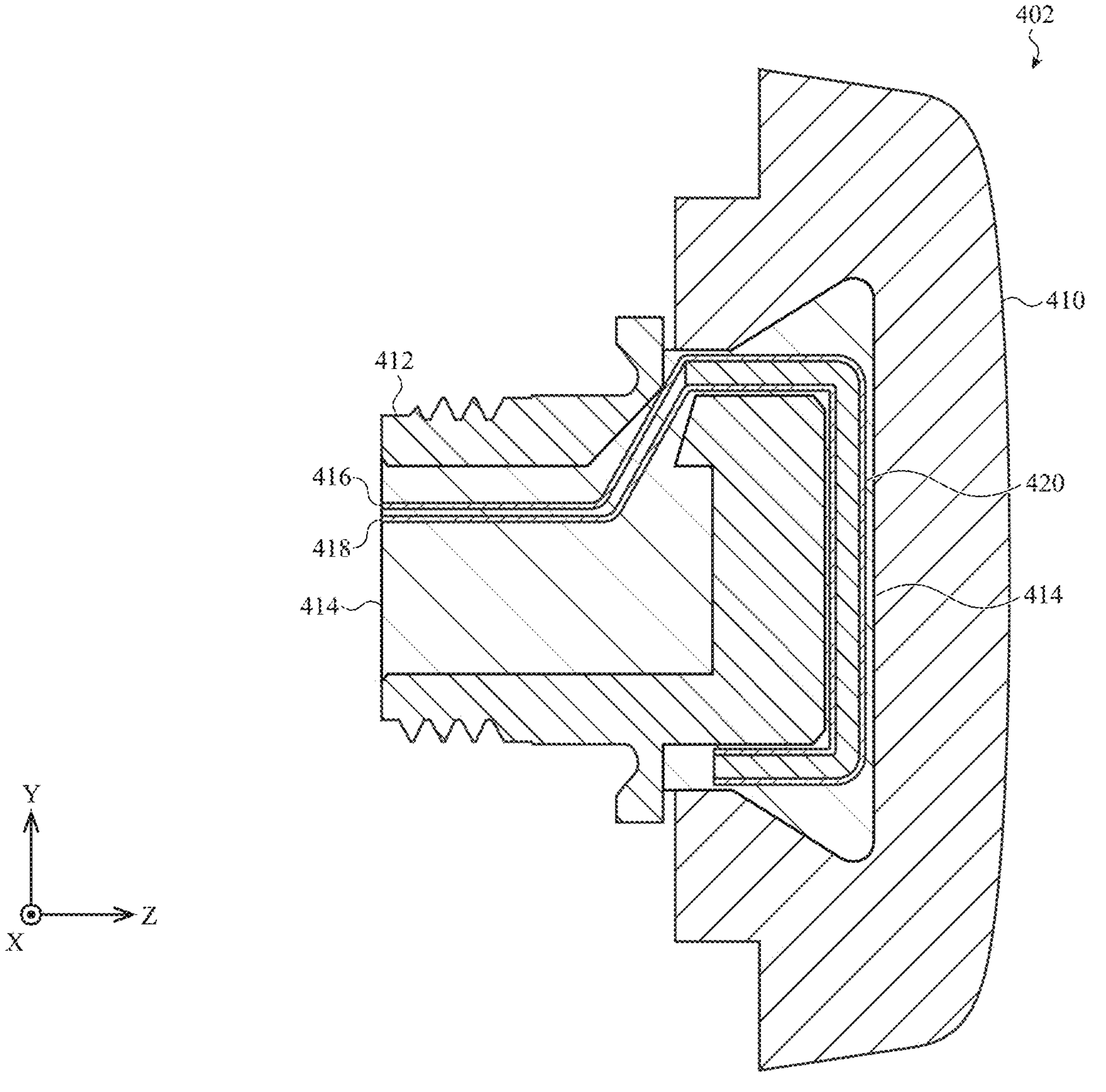
FIG. 4A depicts a sample cross-section of the watch crown at a first position, in which no force is applied to the crown cap.

FIG. 4A illustrates the watch crown 402 at a first position (e.g., a resting position), in which no force is applied to the crown cap 410. Compliant material 414 is positioned between the crown cap 410 and the stud 412. The compliant material 414 facilitates displacement of the crown cap 410 when a force is applied, while providing a restoring force to return the crown cap 410 to its resting position when the force is released, and generally has the same properties and function as compliant material 214 described above with respect to FIG. 2.

Figure 4B:
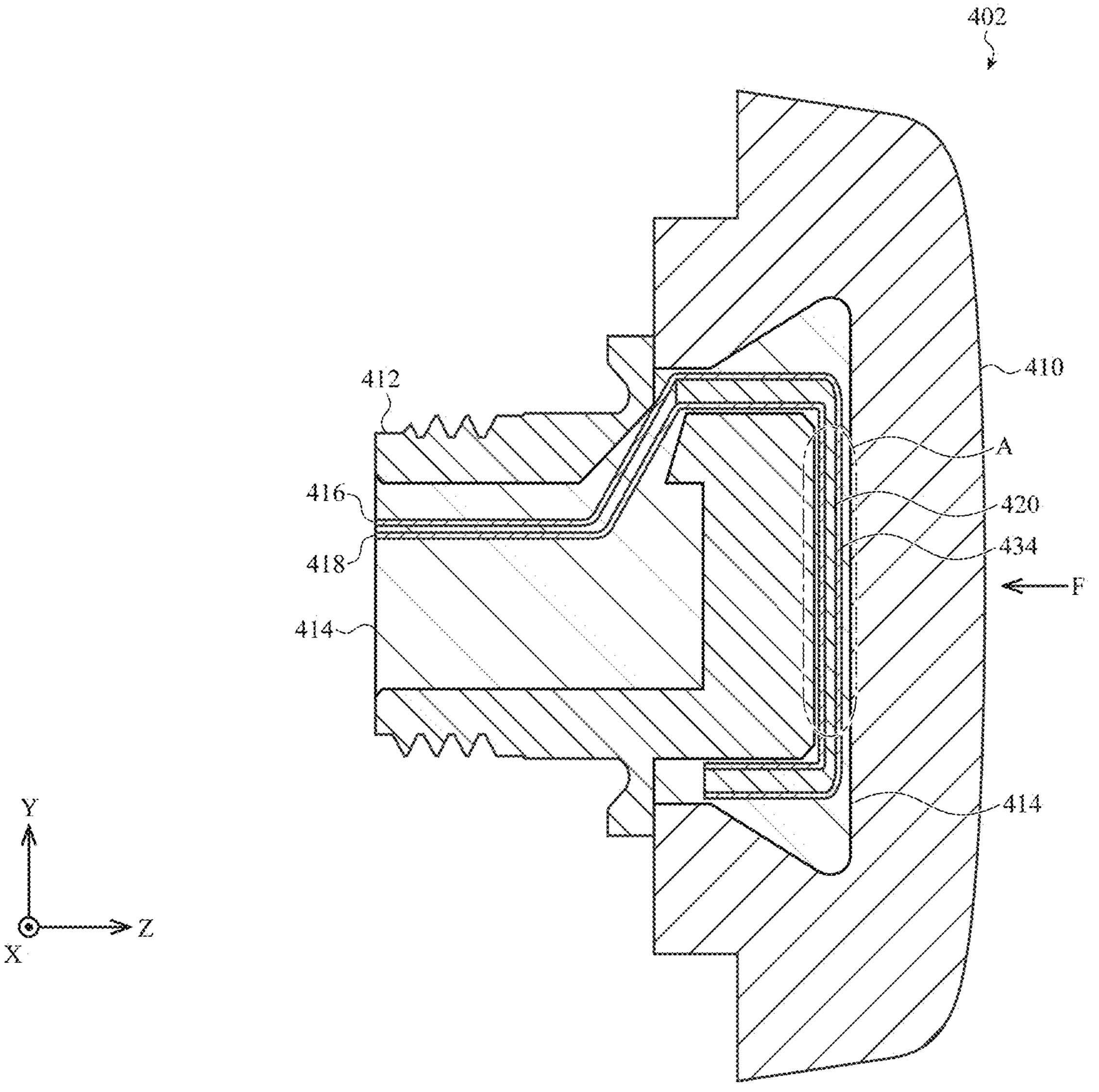
FIG. 4B depicts the watch crown in a second position, in response to a user's application of an axial force to the crown cap.

FIG. 4B depicts the watch crown 402 in a second position, in response to a user's application of an axial force F (e.g., a force along the z-axis) to the crown cap 410. The applied force F may compress the compliant material 414 positioned around point A (e.g., along the end of the stud 412 adjacent the crown cap 410). This compression of the substrate in turn causes the insulating substrate 420 (e.g., electrically insulating substrate) to compress around point A. As the insulating substrate 420 around point A is compressed, the flexible sense circuit 418 and the flexible drive circuit 416 move closer together at point A, and a force sensor 434 detects the compressive force.

A processing unit may determine, based on the force detected by the force sensor 434, that the crown cap 410 has moved along the z-axis (e.g., by comparing the force detected by the force sensor 434 with other force sensors in the flexible drive circuit 416 and the flexible sense circuit 418). The processing unit may further correlate or otherwise associate the force detected with a particular type of input. For example, the axial motion of FIG. 4C may be correlated with a button input, such as selection of an item or the start of a timer. The amount of compressive force F applied along the z-axis may also be detected, and different inputs may correspond to varying amounts of force (e.g., force values) detected by the force sensor 434.

Figure 4C:
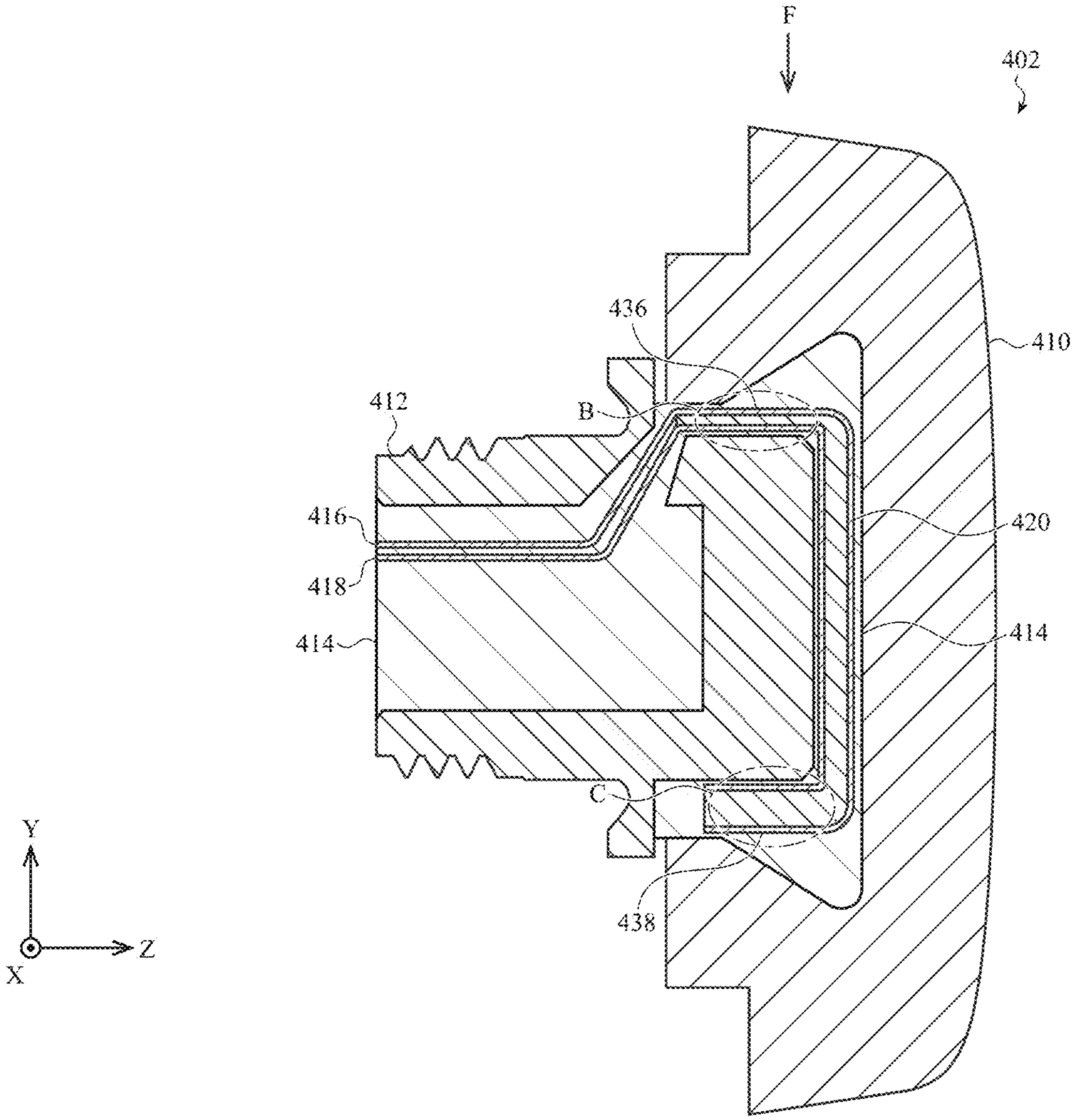
FIG. 4C depicts the watch crown in a third position, in response to a user's application of a lateral force to the crown cap.

In another example, a user may apply a lateral force F (e.g., a force along the y-axis) to the crown cap 410, as depicted in FIG. 4C. The force F may cause the crown cap 410 to move downward relative to the stud 412, compressing the compliant material 414 around point B and placing the compliant material around point C in tension. This may in turn compress the insulating substrate 420 around point B and place the insulating substrate 420 around point C in tension.

In response, the flexible sense circuit 418 and the flexible drive circuit 416 move closer together at point B, and a force sensor 436 detects the compressive force. In addition, the flexible sense circuit 418 and the flexible drive circuit 416 move apart at point C, and a force sensor 438 detects the tension.

Figure 4D:
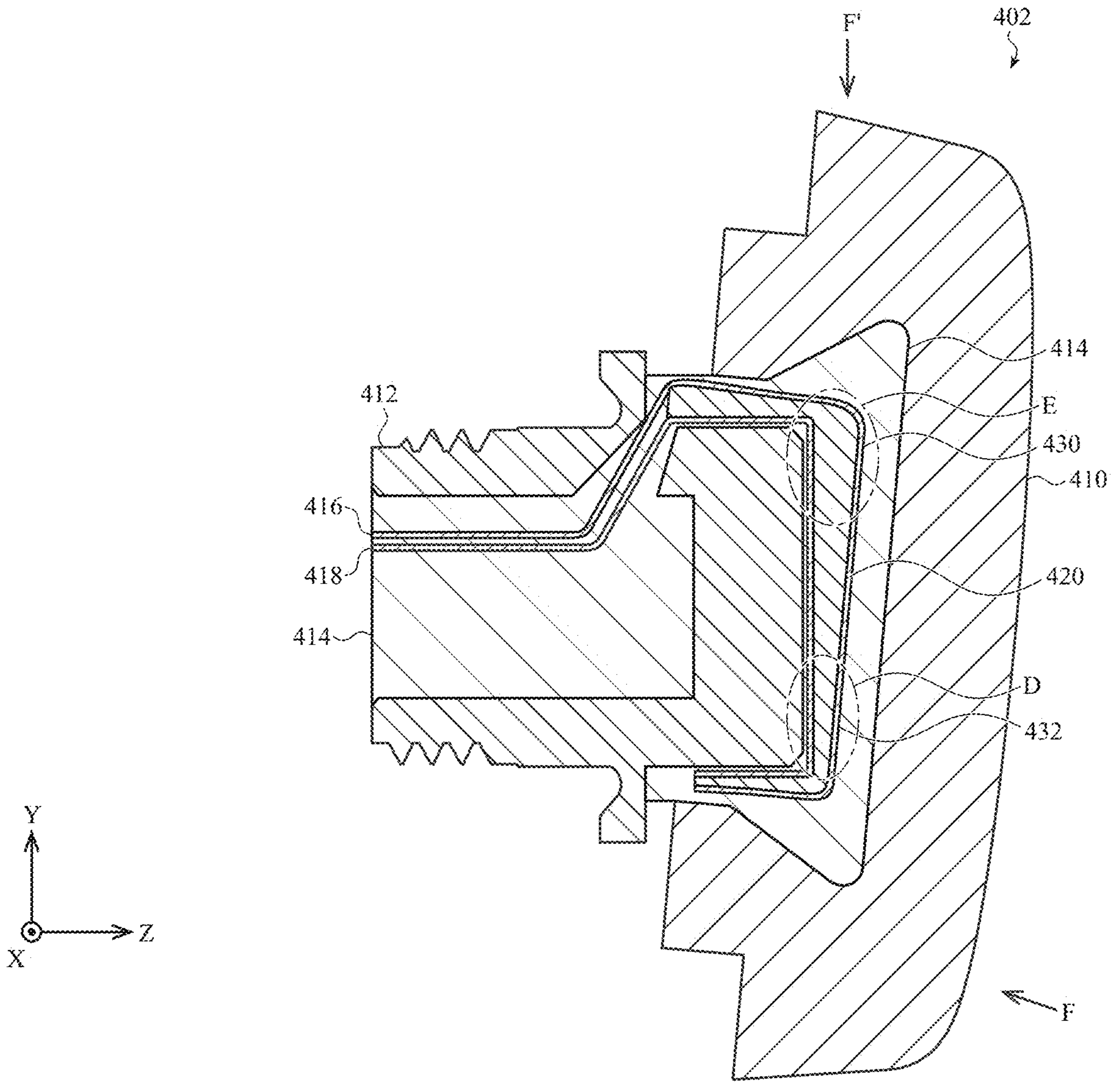
FIG. 4D depicts the watch crown in a fourth position, in response to a user's application of an oblique force to the crown cap.

In another example, as depicted in FIG. 4D, a user may apply a force F to the crown cap 410 at an oblique angle (e.g., an angle which is along a direction between a lateral and axial direction). The force F may cause the crown cap 410 to tilt, compressing the compliant material 414 around point D and placing the compliant material around point E in tension.

In some embodiments, the material properties of the compliant material 414 may cause the crown cap 410 to tilt rather than translate along the y-axis in response to a lateral force F'. For example, the compliant material 414 may resist compression immediately above the stud 412, while allowing compression within the compliant material 414 around point D (e.g., adjacent the end of the stud 412). Thus, the compressive force applied along the y-axis may be transferred to compress the compliant material 414 around point D while placing the compliant material 414 around point E in tension. Accordingly, the crown cap 410 may tilt rather than translate laterally in response to force along the y-axis.

As the compliant material 414 around point D compresses, the insulating substrate 420 around point D is also compressed. As the insulating substrate 420 around point D is compressed, the flexible sense circuit 418 and the flexible drive circuit 416 move closer together at point D, and a first force sensor 432 detects the compressive force.

Simultaneous with the compression around point D, the compliant material around point D may expand (e.g., be placed under tension), placing the insulating substrate 420 in tension. As the insulating substrate 420 around point D is placed in tension, the flexible sense circuit 418 and the flexible drive circuit 416 move apart at point D, and a second force sensor 430 detects the tension.

The processing unit may compare the compressive force detected by the first force sensor 432 and the tension detected by the second force sensor 430 to determine that the crown cap 410 has tilted with respect to the stud 412. The processing unit may further determine the relative amounts of force (e.g., after determining force values corresponding to each respective force sensor 430, 432) or tension measured by the first force sensor 432 and the second force sensor 430 to determine a profile of the type of force applied to the crown cap 410.

Figure 4E:
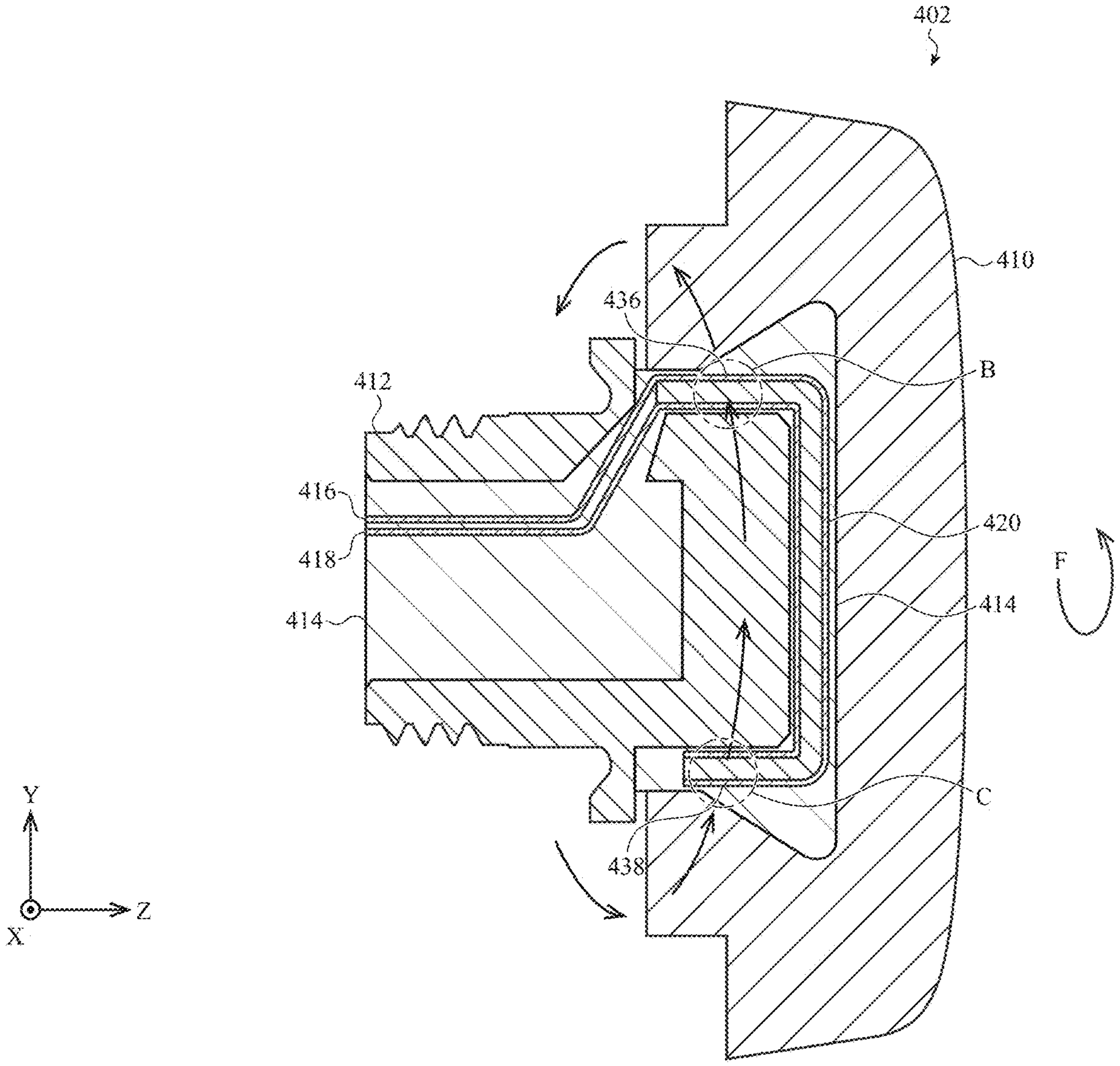
FIG. 4E depicts the watch crown in a fifth position, in response to a rotation of the crown cap.

Turning to FIG. 4E, a rotation of the watch crown 402 may be detected, even in embodiments in which the stud 412 is coupled to the watch housing in a manner that prevents rotation of the stud 412. In such embodiments the crown cap 410 may be partially rotatable with respect to the stud 412. For example, the compliant material 414 between the crown cap 410 and the stud 412 may allow some, but not complete, rotation of the crown cap 410 about the stud 412.

A user may apply a rotational force F (e.g., a force involving a revolution about the z-axis) to the crown cap 410, which causes the compliant material 414 to deform in shear about the z-axis. For example, the compliant material 414 around point B and around point C may be placed under tension and/or compression. As the compliant material 414 deforms, the flexible drive circuit 416 around points B and C may translate about the z-axis relative to the flexible sense circuit 418. Accordingly, a pair of electrodes in the force sensor 436 at the top of the stud 412 may translate away from each other about the Z-axis, causing a change in capacitance to be measured by the force sensor 436. Another pair of electrodes in the force sensor 438 at the bottom of the stud may translate along the same rotational direction, causing a change in capacitance to be measured by the force sensor 438.

The processing unit may compare the rotational force detected by the force sensor 436 at the top of the stud 412 with the rotational force detected by the force sensor 438 at the bottom of the stud 412 to determine that the crown cap 410 has rotated in a particular direction (e.g., clockwise or counter-clockwise) with respect to the stud 412. For example, the electrodes of the force sensor 436 at the top of the stud 412 may be offset such that a clockwise rotation increases the capacitance of the force sensor 436 (due to bringing more of the electrodes in parallel) and a counter-clockwise rotation decreases capacitance of the force sensor 436 (due to separating the electrodes). In some examples, changes in other force sensors may also be analyzed to distinguish a rotation from a lateral force or other input. The processing unit may further determine an amount of rotational force applied to the crown cap 410, which may be interpreted as an intended degree of input rotation.

In some examples, the force sensors 430, 432, 434, 436, 438 may detect force inputs along more than one of the x-, y-, and z-axes. The processor may analyze multiple force sensing signals to determine the directions and amounts of such multi-axial forces. The processor may further compare these force sensing signals to input profiles or otherwise determine an intended type of input to the watch crown 402. For example, the electronic device may be a watch on a user's wrist. In such an embodiment, accidental button presses may occur as a user's wrist moves. The processing unit may receive, from one or more force sensors, force inputs along both the y-axis and the z-axis, or as a tilt similar to FIG. 4D. The processing unit may further determine (e.g., by comparing the force inputs to an input profile or the like) that such an input is unintended, and reject it as a user input. As one example, if the watch crown 402 tilts, the input may be rejected.

In many embodiments, the processing unit may distinguish between the various movements of the watch crown 402 initiated in response to user force. The processing unit may further interpret (e.g., correlate) the movements as distinct inputs for different operations of the electronic device. For example, a first lateral movement (movement along the y-axis) may adjust a brightness or volume associated with the electronic device, while a second lateral movement (movement along the x-axis) may switch the device between a silent mode and an alert mode.

A rotational movement (movement about the z-axis) may cause the electronic device to scroll between a list of available software application for selection, while an axial movement (movement along the z-axis) may select the software application or start a timer. In addition, movements along multiple directions may be processed differently. Force inputs may be compared with one or more force profiles, which may correspond to a particular type of input to the crown cap 410. For example, the lateral force input of FIG. 4C may be treated as a volume change, the rotational input of FIG. 4E may change a graphical display (e.g., by moving a selection indicator), the axial force input of FIG. 4B is treated as a selection, and the tilt input of FIG. 4D is treated as a display brightness change.

It should be understood that the various inputs are adaptable to user preferences and context, and the above examples are illustrative in nature. For example, the electronic device may operate various software applications, and how each type of watch crown 402 movement may be interpreted may be based on an active software application. Generally, the examples given herein are but some sample ways in which an input to the crown may change an indicium (or indicia) displayed by the electronic device. As used herein, an "indicium" is any text, graphic, icon, symbol, or the like, Sample indicia include application icons, volume indicators, brightness indicators, data shown in a list, power indicators, words, numbers, and so on. "Indicia" is the plural of "indicium."

Figure 5A:
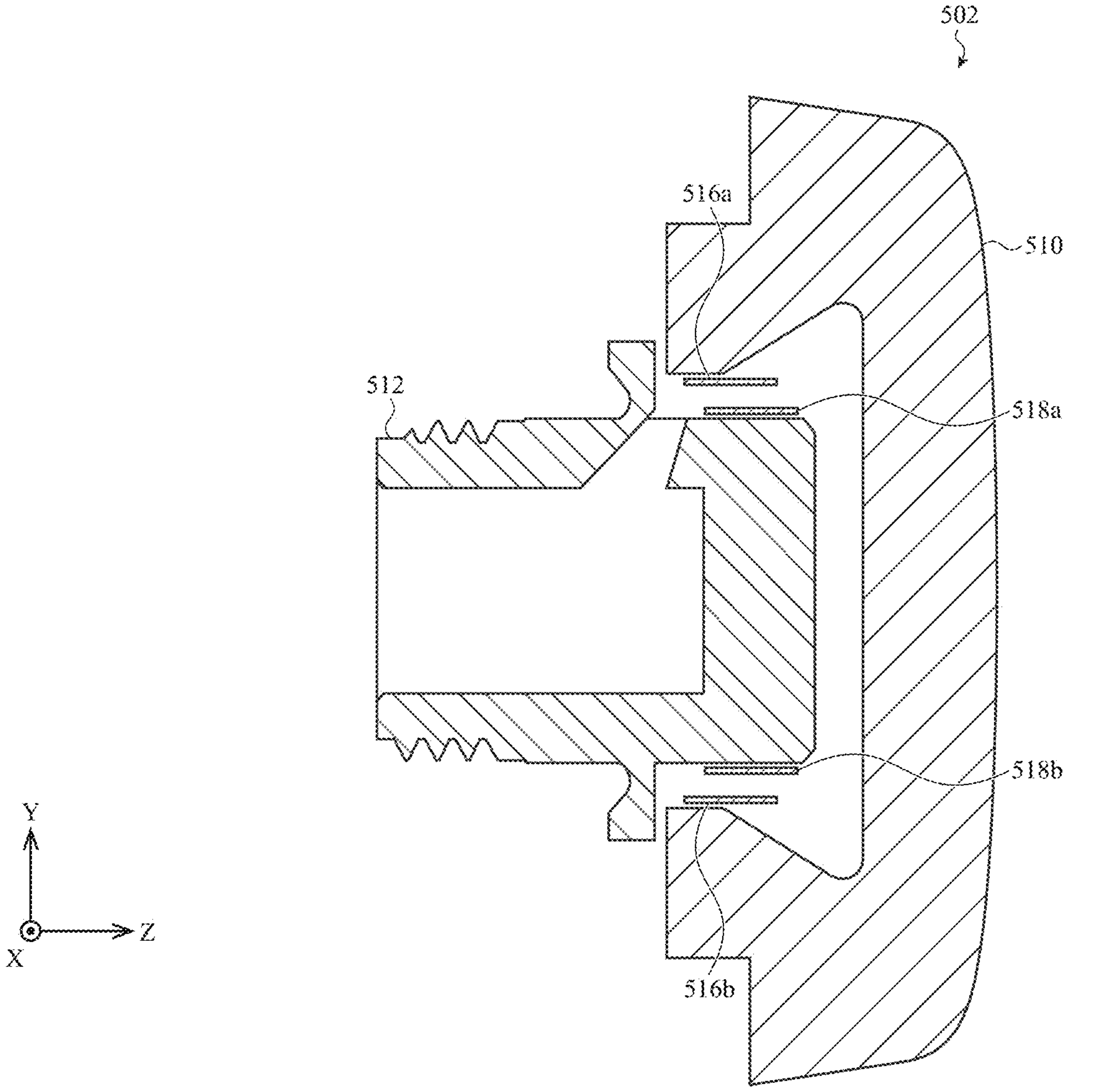
FIG. 5A depicts a sample cross-section of the watch crown, with certain elements removed to better illustrate a force sensor.
Figure 5B:
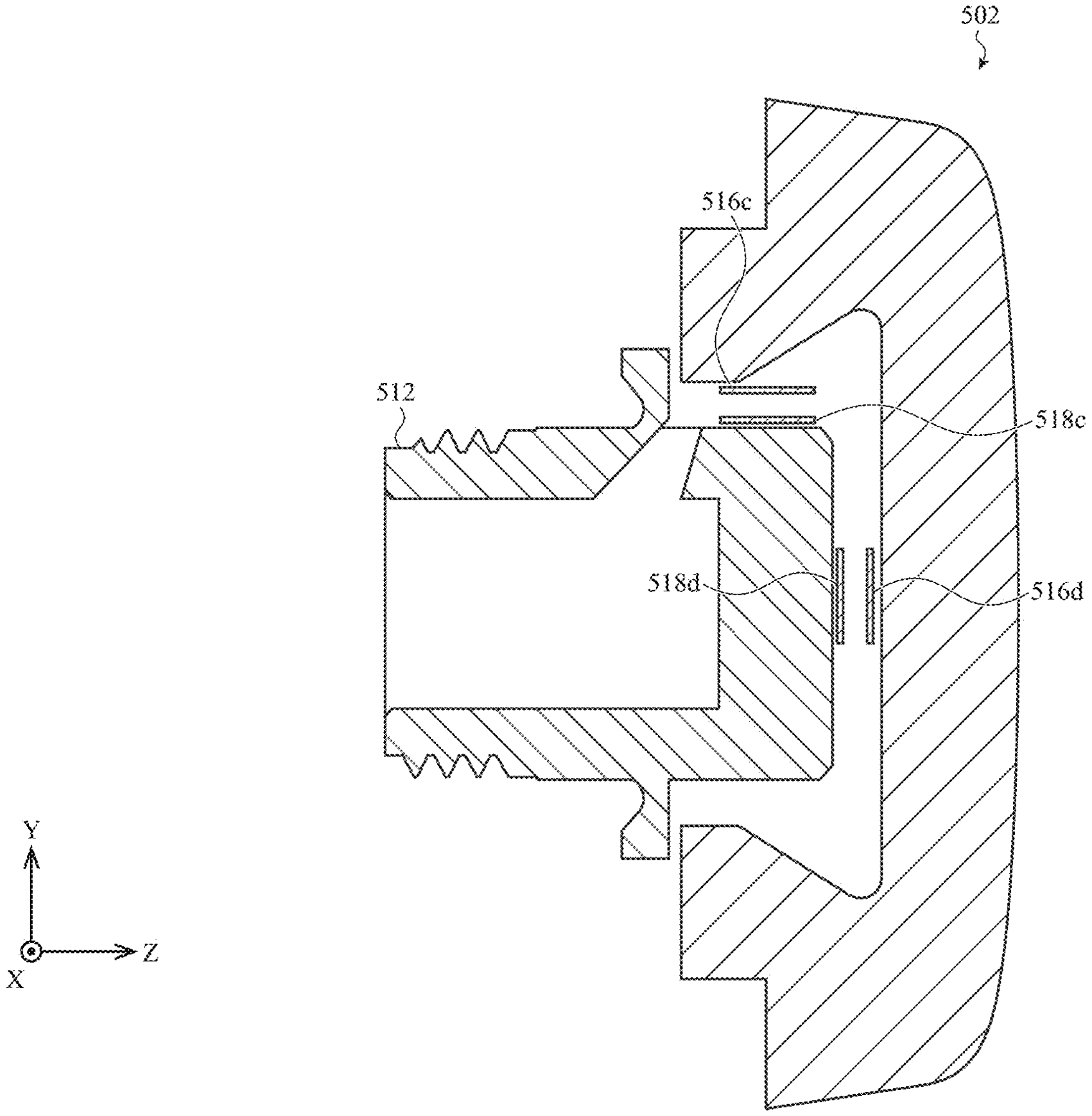
FIG. 5B depicts a sample cross-section of the watch crown, with certain elements removed to better illustrate a second example of a force sensor.
Figure 5C:
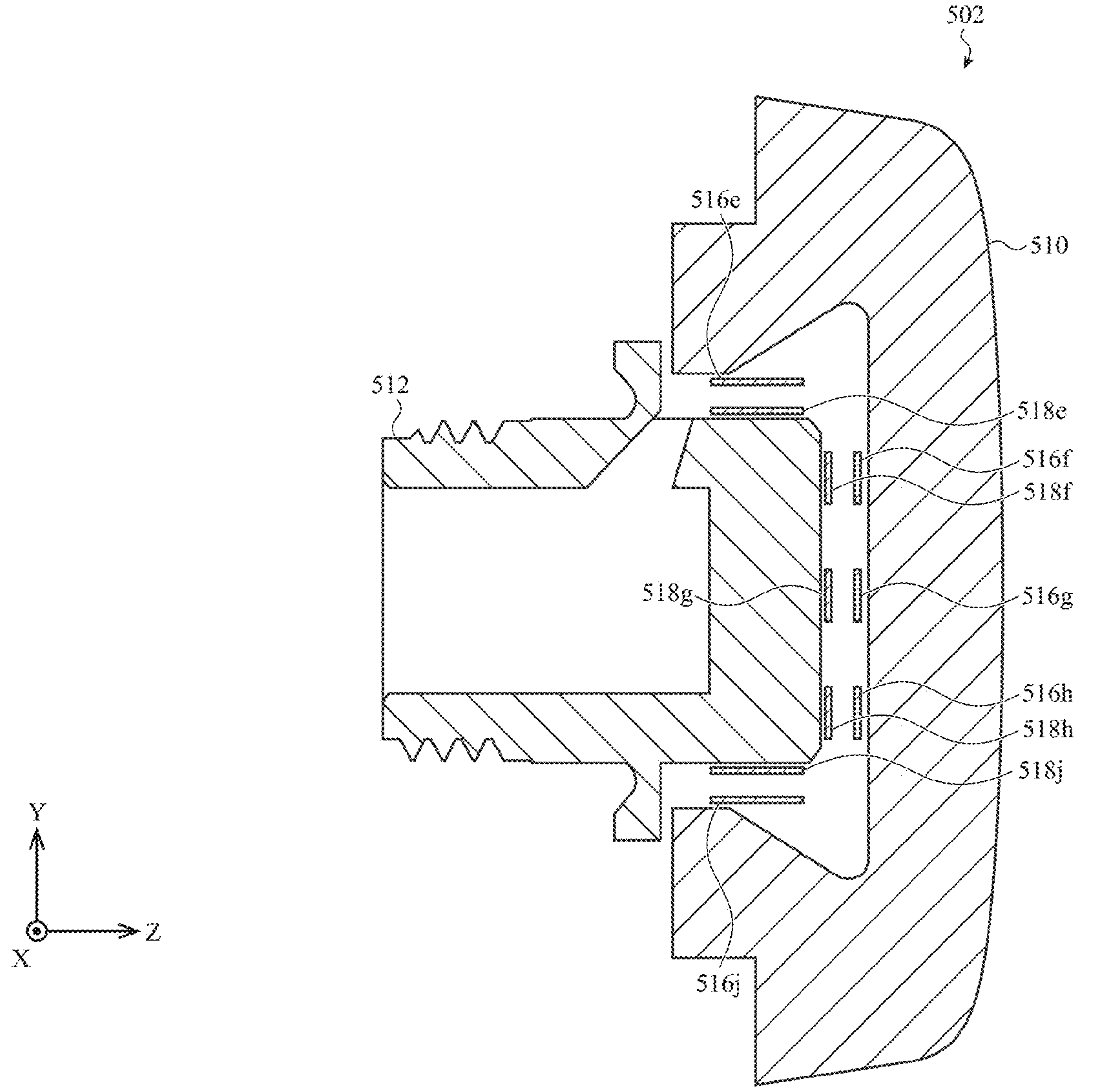
FIG. 5C depicts a sample cross-section of the watch crown, with certain elements removed to better illustrate a third example of a force sensor.

FIGS. 5A-5C depict various potential arrangements for capacitive electrodes (e.g., force sensors) for sensing forces applied to a watch crown. The capacitive electrodes 516*a*-516*j*, 518*a*-518*j* may be formed on or within flexible circuits (such as flexible drive circuit 216 and flexible sense circuit 218 as depicted in FIG. 2), and are shown in FIGS. 5A-5C without such encapsulation for illustrative purposes. Likewise, FIGS. 5A-5C omit compliant material, such as compliant material 214 depicted in FIG. 2, for clarity.

As discussed above, amounts of force applied to the watch crown 502 may be detected by one or more force sensors positioned between the crown cap 510 and the stud 512. The force sensors may be formed from one or more matched pairs of capacitive electrodes 516*a*-516*j*, 518*a*-518*j* coupled to an insulating substrate (such insulating substrate 220 as depicted in FIG. 2, omitted from FIGS. 5A-5C for illustrative purposes). The force sensors may be arranged in various manners to facilitate detection of various inputs, such as depicted above with respect to FIGS. 4A-4D.

For example, FIG. 5A depicts a watch crown 502 having two force sensors. A first force sensor includes a drive electrode 516*a* and a sense electrode 518A positioned at the top of the stud 512. A second force sensor includes a drive electrode 516*b* and a sense electrode 518*b* positioned at the bottom of the stud 512.

In operation, a charge may be placed on the first drive electrode 516*a*, and a capacitance across the first drive electrode 516*a* and the first sense electrode 518*a* may be monitored. As a force is applied to the crown cap 510, the distance between the first drive electrode 516*a* and the first sense electrode 518*a* may change, resulting in the capacitance between the electrodes exhibiting a corresponding change. The change in capacitance may be interpreted by a processing unit as an amount of force (e.g., one or more force values) applied to the crown cap. Each force sensor may operate in a similar manner.

As depicted in FIG. 5A, the drive electrode 516*a*, 516*b* in one or both force sensors may be offset from the corresponding sense electrode 518*a*, 518*b*. Because of this offset, the capacitance may change in distinct manners for distinct force inputs. For example, a force downward (along the y-axis) may increase a detected capacitance at the force sensor above the stud 512 (drive electrode 516*a* and sense electrode 518*a*), while decreasing a detected capacitance at the force sensor below the stud 512 (drive electrode 516*a* and sense electrode 518*a*). A force toward the stud 512 along the z-axis decreases the detected capacitance at both force sensors.

A force along a particular axis may cause an increase or a decrease in capacitance at each force sensor (represented by pairs of drive electrodes and sense electrodes). The below table illustrates how a force along each direction may cause the measured capacitance of each force sensor to increase (+) or decrease (−). It should be understood that the magnitude of capacitance change may vary between each force sensor even where the two sensors increase or two sensors decrease.

| Force direction | 516a, 518a | 516b, 518b |
|---|---|---|
| X+ | − | − |
| X− | − | − |
| Y+ | − | + |
| Y− | + | − |
| Z+ | + | + |
| Z− | − | − |

The table above illustrates the X+, X−, and Z− directions as all having similar responses in the force sensors. Accordingly, in many embodiments at least one additional force sensor (not depicted in the cross-section of FIG. 5A) may be configured to distinguish force along the x-axis. For example, a force sensor may be positioned behind the stud 512 which detects an increased capacitance in response to force along the X+ direction and a decreased capacitance in response to force along the X− direction. Another force sensor may be positioned in front of the stud 512 which has the reverse response to forces along the x-axis.

In other embodiments, the watch crown 502 may include additional force sensors, or the force sensors may be arranged differently. For example, as depicted in FIG. 5B, a first force sensor may be formed from a first drive electrode 516*c* and a first sense electrode 518*c* positioned at the top of the stud 512. Another force sensor may be formed from a second drive electrode 516*d* and a second sense electrode 518*d* positioned at the protruding end of the stud 512. Similar to the arrangement of FIG. 5A, the force sensors depicted in FIG. 5B may be positioned to distinguish between force inputs along different directions, in which capacitance may increase as the electrodes in a force sensor move together or the overlapping plate area increases, and capacitance may decrease as the electrodes in a force sensor move apart or the overlapping plate area decreases.

The below table illustrates how a force along each direction may cause the measured capacitance of each force sensor to increase (+) or decrease (−).

| Force direction | 516c, 518c | 516d, 518d |
|---|---|---|
| X+ | − | − |
| X− | − | − |
| Y+ | − | − |
| Y− | + | − |
| Z+ | − | − |
| Z− | − | + |

The table above illustrates the X+, X−, and Z− directions as all having similar responses in the force sensors. Accordingly, in many embodiments at least one additional force sensor (not depicted in the cross-section of FIG. 5B) may be configured to distinguish force along the x-axis. For example, a force sensor may be positioned behind the stud 512 which detects an increased capacitance in response to force along the X+ direction and a decreased capacitance in response to force along the X− direction. Another force sensor may be positioned in front of the stud 512 which has the reverse response to forces along the x-axis.

As depicted in FIG. 5C, additional force sensors may be included in a watch crown 502 to provide additional data points available to register and interpret a force input to the watch crown 502. For example, force sensors may be formed between a first drive electrode 516*e* and a first sense electrode 518*e*; between a second drive electrode 516*f* and a second sense electrode 518*f*; between a third drive electrode 516*g* and a third sense electrode 518*g*; between a fourth drive electrode 516*h* and a fourth sense electrode 518*h*; and between a fifth drive electrode 516*j* and a fifth sense electrode 518*j*.

The below table illustrates how a force along each direction may cause the measured capacitance of each force sensor to increase (+) or decrease (−).

| Force direction | 516e, 518e | 516f, 518bf | 516g, 518g | 516h, 518h | 516j, 518j |
|---|---|---|---|---|---|
| X+ | − | − | − | − | − |
| X− | − | − | − | − | − |
| Y+ | − | − | − | − | + |
| Y− | + | − | − | − | − |
| Z+ | − | − | − | − | − |
| Z− | − | + | + | + | − |

The table above illustrates the X+, X−, and Z− directions as all having similar responses in the force sensors. Accordingly, in many embodiments at least one additional force sensor (not depicted in the cross-section of FIG. 5C) may be configured to distinguish force along the x-axis. For example, a force sensor may be positioned behind the stud 512 which detects an increased capacitance in response to force along the X+ direction and a decreased capacitance in response to force along the X− direction. Another force sensor may be positioned in front of the stud 512 which has the reverse response to forces along the x-axis.

The multiple force sensors depicted in FIG. 5C along the end of the stud 512 (e.g., formed by drive electrodes 516*f*, 516*g*, 516*h* and sense electrodes 518*f*, 518*g*, 518*h*) may further facilitate distinguishing forces at oblique angles, such as forces causing a tilt as depicted in FIG. 4D. In some embodiments, additional force sensors may be included around the stud 512 to distinguish force inputs along additional directions and further clarify the direction of force being detected.

In many embodiments, a processing unit correlates an amount of force exerted on the crown cap 510 with changes in capacitance at one or more force sensors. The changes in capacitance may thus be expressed with a given magnitude and signed value. Generally, a positive value indicates an increase in capacitance, and a negative value indicates a decrease in capacitance. The processing unit may compare the magnitude and sign of changes at each pixel, along with a known location of each pixel, in order to determine a vector representing the magnitude and three-dimensional direction of an input to the watch crown 502. The accuracy of the determined vector may depend on the location and number of force sensors, with an increased number of force sensors generally yielding a more accurate determination.

In some embodiments, the capacitance measurements of the force sensors may be processed in other ways in order to determine an input to the watch crown 502 based on the measurements. For example, the processing unit may be coupled to a memory storing input profiles, in which the measured changes in capacitance may be compared to the input profiles to determine a type of user input.

FIGS. 2-5C have been discussed generally with reference to detecting a force applied to the watch crown using capacitive force sensing elements. It should be understood that embodiments of the present disclosure may incorporate other force or displacement sensing elements to achieve similar aims. For example, each force sensor may be formed using a strain gauge, a piezoelectric sensor, a force-sensitive resistor, and similar force or displacement sensing elements. Accordingly, discussion of force sensors with reference to capacitive force sensing are illustrative in nature and would apply similarly to other force or displacement sensing elements.

Figure 6:
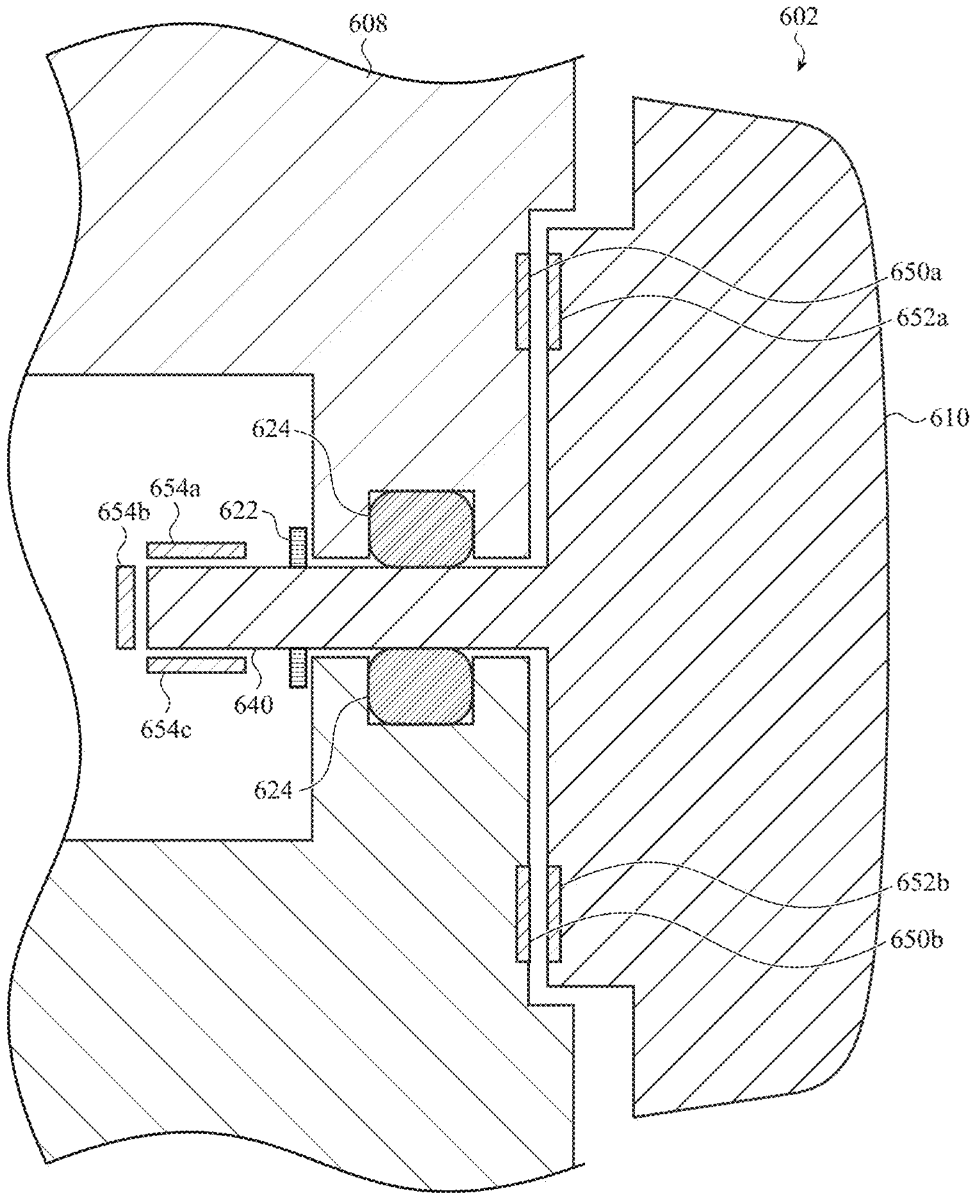
FIG. 6 depicts a cross-section of another example embodiment of a watch crown coupled to the housing of the electronic device of FIG. 1, taken along line A-A of FIG. 1.

FIG. 6 depicts a cross-section of another example embodiment of a watch crown coupled to the housing of the electronic device of FIG. 1, taken along line A-A of FIG. 1. The watch crown 602 includes a shaft 640 which rotatably couples to the housing 608 of the electronic device. The shaft 640 extends outward from the housing 608 and couples to a crown cap 610. In some embodiments, the shaft 640 and/or crown cap 610 are formed from a rigid material, such as metal (e.g., aluminum, steel, copper, brass, etc.), plastic, glass, acrylic, ceramic, other materials, or combinations of materials. In some embodiments, the shaft 640 and crown cap 610 are integrally formed, while in other embodiments they may be separately formed and coupled together.

The crown cap 610 may provide an input surface for user interaction. For example, the watch crown 602 may facilitate displacement to the watch crown 602 along three axes: the x-axis (lateral in a first direction relative to the shaft 640), the y-axis (lateral in a second direction relative to the shaft 640), and the z-axis (axially, or along the axis of the shaft 640). For example, a series of force sensors 654*a*, 654*b*, 654*c* may be placed on or around an internal portion of the shaft 640. The force sensors 654*a*, 654*b*, 654*c* may detect an amount and direction of force applied to the crown cap 610, as translated to the end of the shaft 640. For example, the force sensors 654*a*, 654*b*, 654*c* may deform in response to movements of the shaft 640 in a manner similar to the force sensors depicted in FIGS. 4A-5C.

Generally, the crown cap 602 and the shaft 640 may also receive rotational inputs. For example, the shaft 640 may be a rotatable shaft and rotational input to the watch crown 602 may be detected by positional sensors 650*a*, 650*b*. In some embodiments, positional sensors 650*a*, 650*b* may be coupled to the housing 608 adjacent the crown cap 610. The positional sensors 650*a*, 650*b* may detect the rotational position of the crown cap by detecting the location of one or more electrodes 652*a*, 652*b* or other positional indicators on the crown cap 610. The positional sensors 650*a*, 650*b* may operate by capacitive sensing, optical sensing, strain sensing, or similar techniques. A number of positional sensors 650*a*, 650*b* and/or electrodes (positional indicators) 652*a*, 652*b* may be included in the watch crown 602 to enable detection of the rotational position of the crown cap 610, and may additionally enable a determination of the speed, acceleration, and similar attributes of rotational inputs.

A processing unit coupled to the positional sensors 650*a*, 650*b* may determine an amount of movement, speed, acceleration, and/or other attributes of rotational inputs. In some embodiments, the processing unit may determine whether an amount of rotation exceeds a threshold, and may register an input (e.g., scrolling through a list of items, or otherwise changing an indicium on the display) once the amount of rotation exceeds the threshold.

In many embodiments, the shaft 640 is coupled to the housing 608 by a retaining clip 622, or similar fastener, which may retain the end of the shaft 640 within the housing 608, while allowing the shaft 640 to rotate about the z-axis, and be displaced slightly along the x-, y-, and z-axes. In some embodiments, a compliant material (omitted from FIG. 6 for clarity) may surround all or a portion of the shaft. The compliant material may facilitate a transfer of force from the shaft 640 to the force sensors 654*a*, 654*b*, 654*c*. The watch crown may include additional elements, such as an O-ring 624, which may be similar to elements depicted in FIG. 2.

Figure 7:
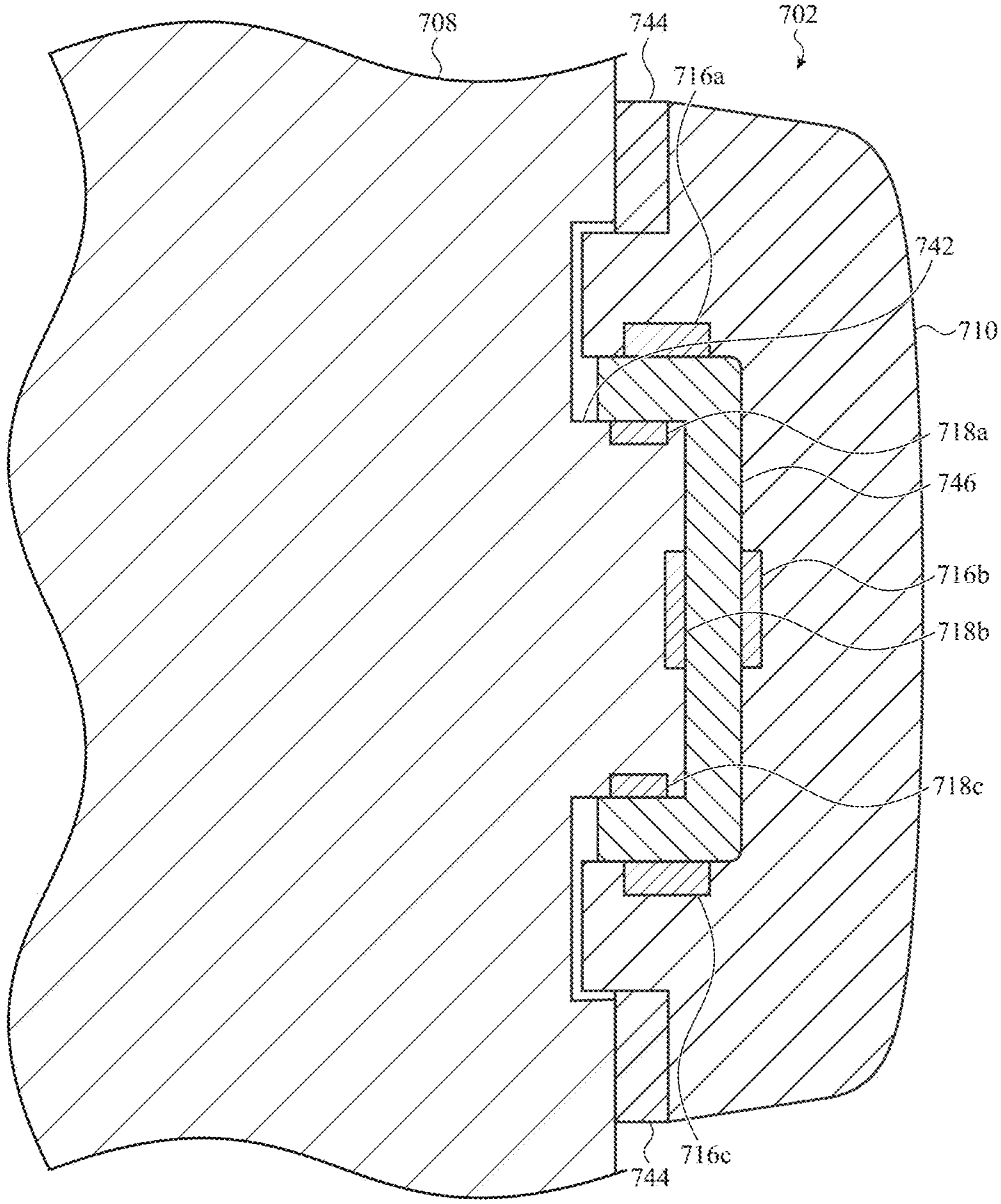
FIG. 7 depicts a cross-section of another example embodiment of a watch crown coupled to the housing of the electronic device of FIG. 1, taken along line A-A of FIG. 1.

FIG. 7 depicts a cross-section of another example embodiment of a watch crown coupled to the housing of the electronic device of FIG. 1, taken along line A-A of FIG. 1. The watch crown 702 may be similar to the watch crown 202 depicted in FIG. 2. Here, the crown cap 710 may couple to a protrusion 742 from the housing 708 of the electronic device. In some embodiments, the protrusion 742 is formed integrally with the housing 708, while in other embodiments the protrusion 742 is formed separately and coupled to the housing 708.

Similar to the watch crown 202 of FIG. 2, a compliant material 746 may be placed between the crown cap 710 and the protrusion 742 to facilitate displacement of the crown cap 710 along the x-, y-, and z-axes, and may also facilitate partial rotation of the crown cap 710. The watch crown 702 may also include a gasket 744 (such as a silicone or a rubber gasket) coupled to the crown cap 710 and/or the housing 708 at the edge of the crown cap 710 to prevent entry of contaminants.

The watch crown 702 may further include force sensors, such as a series of capacitive force sensors (similar to the force sensors described with respect to FIGS. 4A-5C) formed using drive electrodes 716*a*, 716*b*, 716*c* coupled to the crown cap 710 and corresponding sense electrodes 718*a*, 718*b*, 718*c* coupled to the protrusion 742. As force is applied to the crown cap 710, the compliant material 746 between the first drive electrode 716*a* and the first sense electrode 718*a* may be compressed, resulting in a change in capacitance across the first drive electrode 716*a* and the first sense electrode 718*a*.

Figure 8:
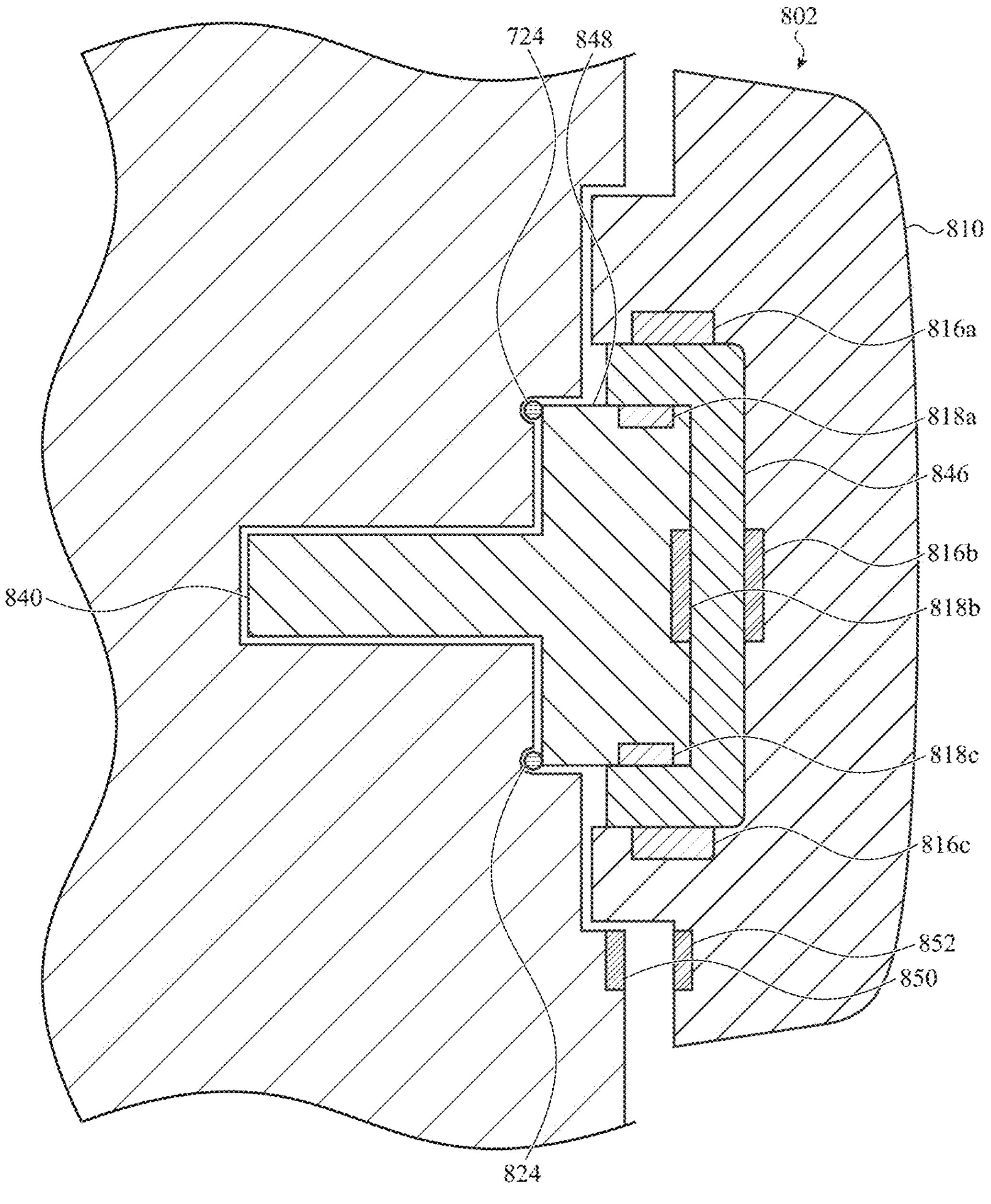
FIG. 8 depicts a cross-section of another example embodiment of a watch crown coupled to the housing of the electronic device of FIG. 1, taken along line A-A of FIG. 1.

FIG. 8 depicts a cross-section of another example embodiment of a watch crown coupled to the housing of the electronic device of FIG. 1, taken along line A-A of FIG. 1. The watch crown 702 may be similar to the watch crown 202 depicted in FIG. 2, the watch crown 602 depicted in FIG. 6, and/or the watch crown 702 depicted in FIG. 7. The watch crown 802 includes a shaft 840 which rotatably couples to the housing 808 of the electronic device. The shaft 840 extends outward from the housing 808 into a flared end 848 and couples to a crown cap 810. The watch crown 802 may also include an O-ring 824 housed within a depression of the housing 808 and/or the shaft 840.

A compliant material 846 may be placed between the crown cap 810 and the flared end 848 of the shaft 840 to facilitate displacement of the crown cap 810 along the x-, y-, and z-axes. A series of capacitive force sensors may be formed using drive electrodes 816*a*, 816*b*, 816*c* coupled to the crown cap 810 and corresponding sense electrodes 818*a*, 818*b*, 818*c* coupled to the flared end 848 of the shaft 840.

The watch crown 802 may further receive rotational inputs to the crown cap 810, causing the shaft 840 to rotate about the z-axis. One or more positional sensors 850 may be coupled to the housing 808 adjacent the crown cap 810. The positional sensor 850 may detect a rotational position of the crown cap 810 by detecting the location of one or more electrodes 852 or other positional indicators on the crown cap 810.

FIGS. 9A-11B generally depict examples of manipulating graphics displayed on an electronic device through inputs provided by force and/or rotational inputs to a crown of the device. This manipulation (e.g., selection, acknowledgement, motion, dismissal, magnification, and so on) of a graphic may result in changes in operation of the electronic device and/or graphics displayed by the electronic device. Although specific examples are provided and discussed, many operations may be performed by rotating and/or applying force to a crown such as the examples described above. Accordingly, the following discussion is by way of example and not limitation.

Figure 9A:
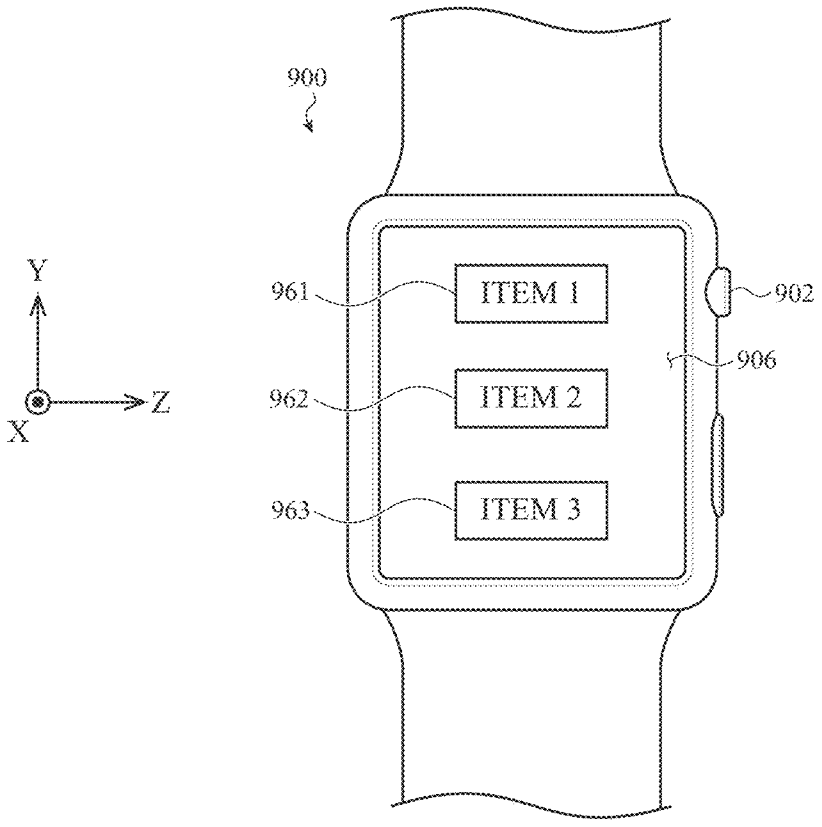
FIG. 9A depicts an example electronic device having a watch crown and a display depicting example graphics.

FIG. 9A depicts an example electronic device 900 (shown here as an electronic watch) having a watch crown 902. The watch crown 902 may be similar to the examples described above, and may receive force inputs along a first lateral direction, a second lateral direction, or an axial direction of the watch crown. The watch crown 902 may also receive rotational inputs. A display 906 shows information and/or other graphics. In the current example, the display 906 depicts a list of various items 961, 962, 963, all of which are example indicia.

Figure 9B:
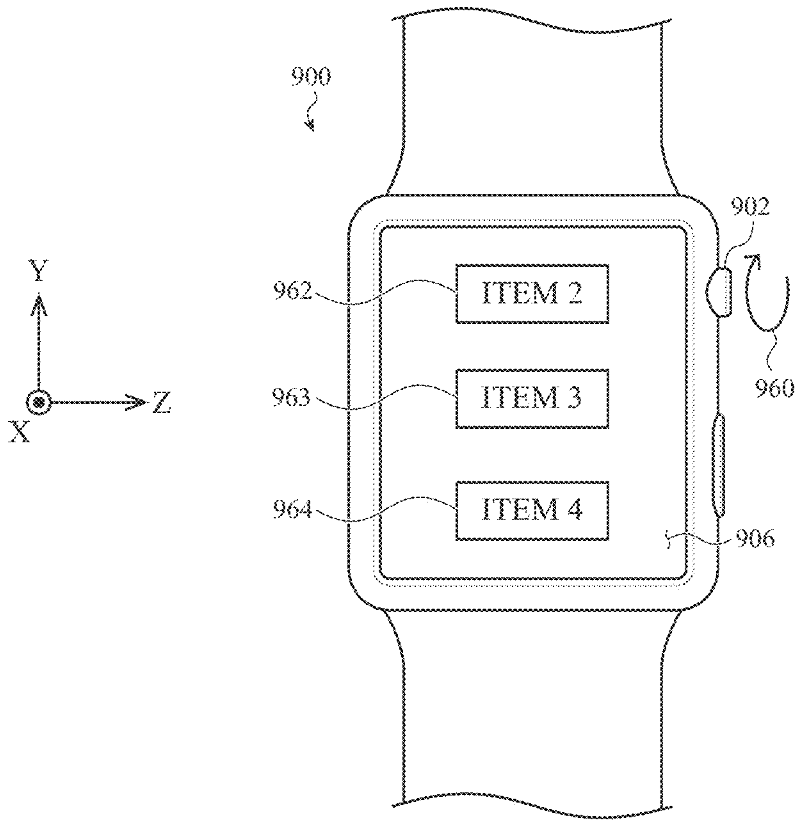
FIG. 9B depicts the electronic device of FIG. 9A, illustrating how the graphics shown on the display change as the watch crown rotates.

FIG. 9B illustrates how the graphics shown on the display 906 change as the watch crown 902 rotates, partially or completely (as indicated by the arrow 960). Rotating the watch crown 902 causes the list to scroll or otherwise move on the screen, such that the first item 961 is no longer displayed, the second and third items 962, 963 each move upwards on the display, and a fourth item 964 is now shown at the bottom of the display. This is one example of a scrolling operation that can be executed by rotating the watch crown 902. Such scrolling operations may provide a simple and efficient way to depict multiple items relatively quickly and in sequential order. A speed of the scrolling operation may be controlled by the amount of rotational force applied to the watch crown 902 and/or the speed at which the watch crown 902 is rotated. Faster or more forceful rotation may yield faster scrolling, while slower or less forceful rotation yields slower scrolling. The watch crown 902 may receive an axial force (e.g., a force inward toward the display 906 or watch body) to select an item from the list, in certain embodiments.

Figure 10A:
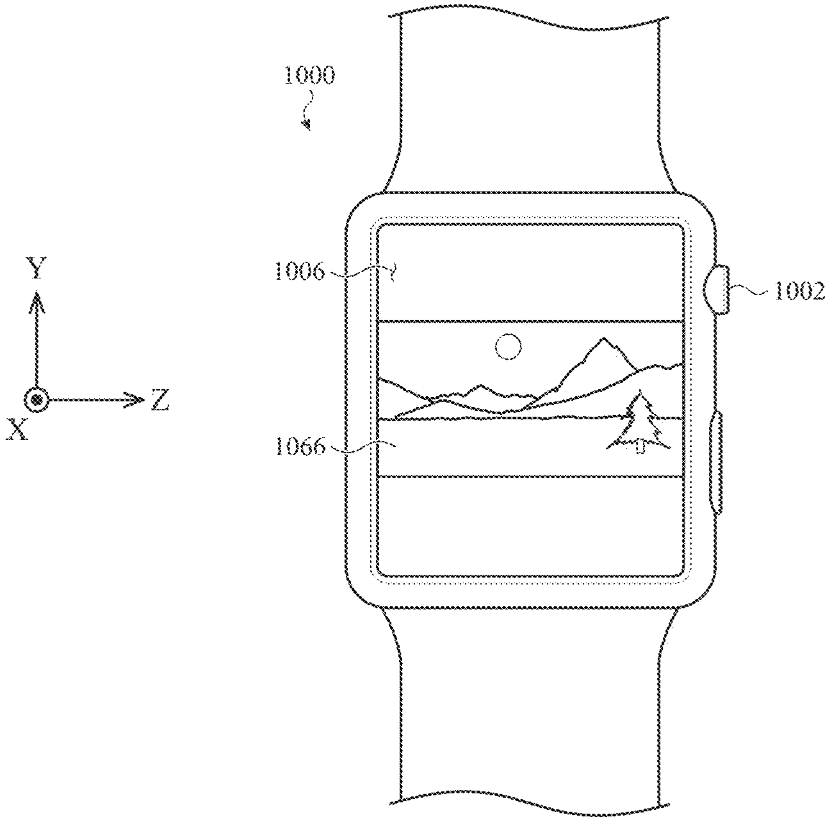
FIG. 10A depicts an example electronic device with a display depicting another example of a graphic.
Figure 10B:
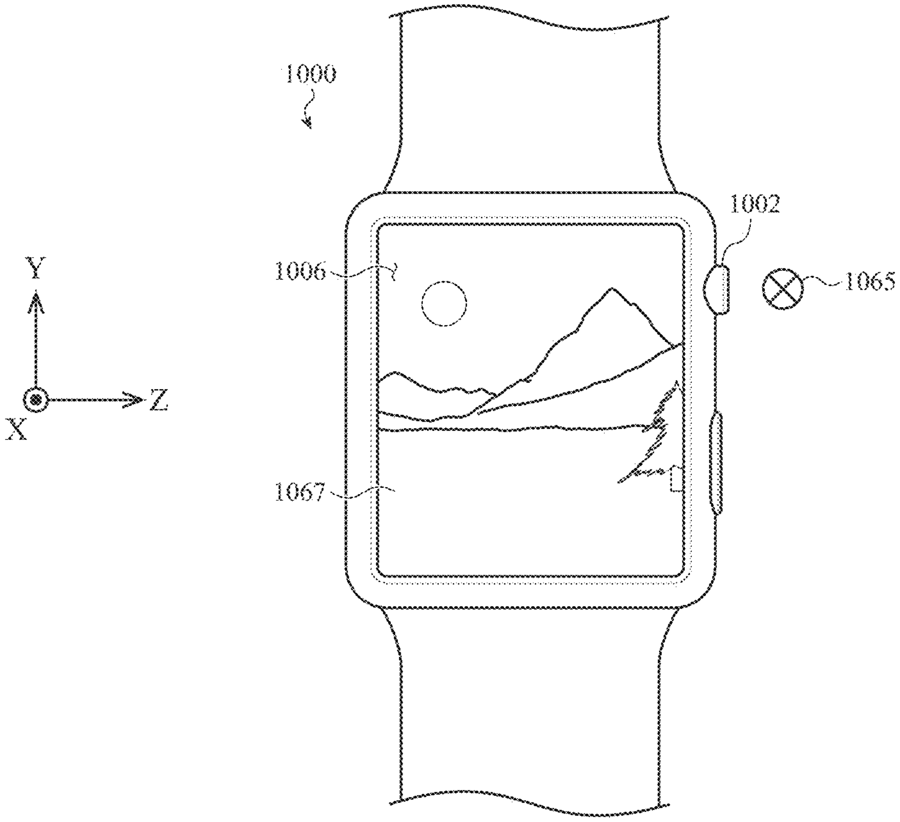
FIG. 10B depicts the electronic device of FIG. 10A, illustrating an example zoom operation in response to application of force to the crown.

FIGS. 10A and 10B illustrate an example zoom operation. The display 1006 depicts a picture 1066 at a first magnification, shown in FIG. 10A; the picture 1066 is yet another example of an indicium. A user may apply a lateral force (e.g., a force along the x-axis) to the watch crown 1002 of the electronic device 1000 (illustrated by arrow 1065), and in response the display may zoom into the picture 1066, such that a portion 1067 of the picture is shown at an increased magnification. This is shown in FIG. 10B. The direction of zoom (in vs. out) and speed of zoom, or location of zoom, may be controlled through force applied to the watch crown 1002, and particularly through the direction of applied force and/or magnitude of applied force. Applying force to the watch crown 1002 in a first direction may zoom in, while applying force to the watch crown 1002 in an opposite direction may zoom out. Alternately, rotating or applying force to the watch crown 1002 in a first direction may change the portion of the picture subject to the zoom effect. In some embodiments, applying an axial force (e.g., a force along the z-axis) to the watch crown 1002 may toggle between different zoom modes or inputs (e.g., direction of zoom vs. portion of picture subject to zoom). In yet other embodiments, applying force to the watch crown 1002 along another direction, such as along the y-axis, may return the picture 1066 to the default magnification shown in FIG. 10A.

Figure 11A:
FIG. 11A depicts an example electronic device with a display depicting another example of a graphic.
Figure 11B:
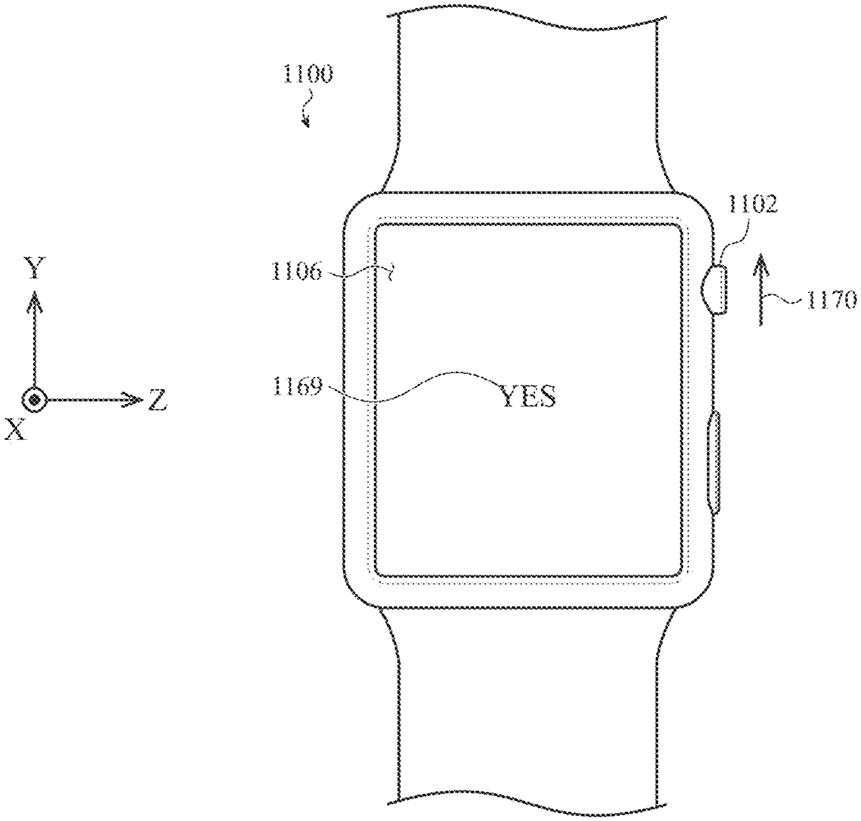
FIG. 11B depicts the electronic device of FIG. 11A, illustrating using the watch crown to change an operational state of the electronic device or otherwise toggle between inputs.

FIGS. 11A and 11B illustrate possible use of the watch crown 1102 to change an operational state of the electronic device 1100 or otherwise toggle between inputs. Turning first to FIG. 11A, the display 1106 depicts a question 1168, namely, "Would you like directions?" As shown in FIG. 11B, a lateral force may be applied to the watch crown 1102 (illustrated by arrow 1170) to answer the question. Applying force to the watch crown 1102 provides an input interpreted by the electronic device 1100 as "yes," and so "YES" is displayed as a graphic 1169 on the display 1106. Applying force to the watch crown 1102 in an opposite direction may provide a "no" input. Both the question 1168 and graphic 1169 are examples of indicia.

In the embodiment shown in FIGS. 11A and 11B, the force applied to the watch crown 1102 is used to directly provide the input, rather than select from options in a list (as discussed above with respect to FIGS. 9A and 9B).

As mentioned previously, force or rotational input to a watch crown of an electronic device may control many functions beyond those listed here. The watch crown may receive distinct force or rotational inputs to adjust a volume of an electronic device, a brightness of a display, or other operational parameters of the device. A force or rotational input applied to the watch crown may rotate to turn a display on or off, or turn the device on or off. A force or rotational input to the crown may launch or terminate an application on the electronic device. Further, combinations of inputs to the watch crown may likewise initiate or control any of the foregoing functions, as well.

Figure 12:
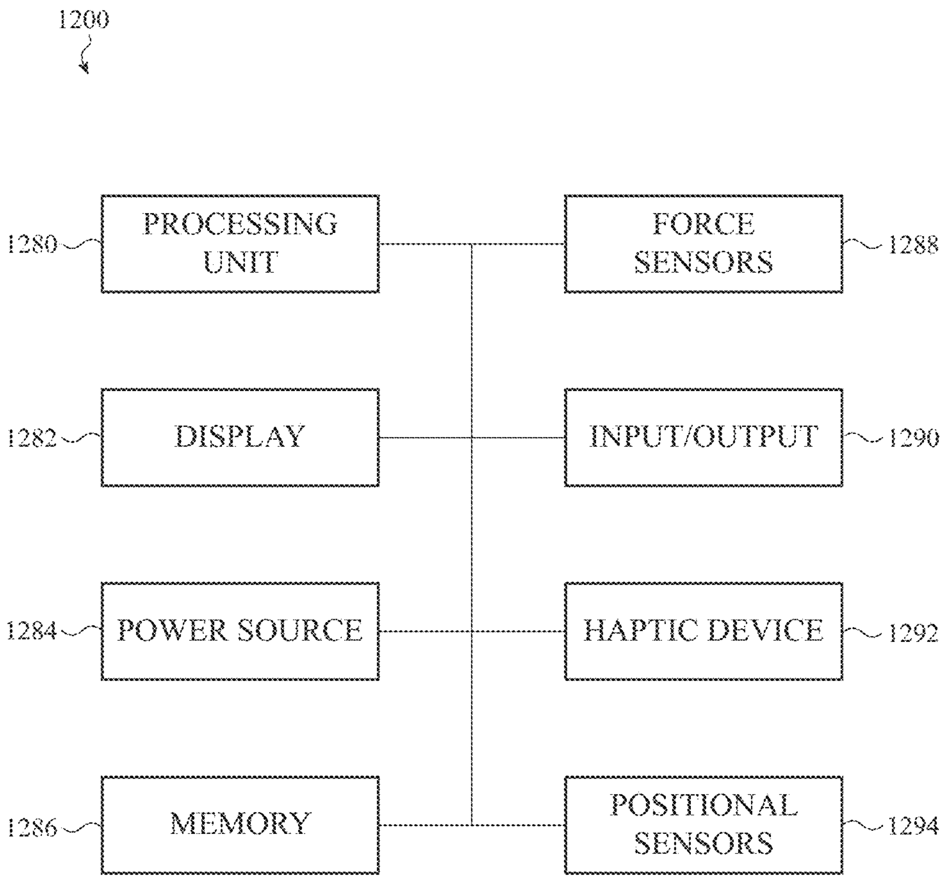
FIG. 12 depicts a schematic representation of example components of an electronic device.

FIG. 12 depicts example components of an electronic device in accordance with the embodiments described herein. The schematic representation depicted in FIG. 12 may correspond to components of the devices depicted in FIGS. 1-11B, described above. However, FIG. 12 may also more generally represent other types of devices with a tri-axial input mechanism similar to the watch crown described above.

As shown in FIG. 12, a device 1200 includes a processing unit 1280 operatively connected to computer memory 1286. The processing unit 1280 may be operatively connected to the memory 1286 via an electronic bus or bridge. The processing unit 1280 may include one or more computer processors or microcontrollers that are configured to perform operations in response to computer-readable instructions. Additionally or alternatively, the processing unit 1280 may include other processors within the device 1200 including application specific integrated chips (ASIC) and other microcontroller devices. The processing unit 1280 may be configured to perform functionality described in the examples above.

The memory 1286 may include a variety of types of non-transitory computer-readable storage media, including, for example, read access memory (RAM), read-only memory (ROM), erasable programmable memory (e.g., EPROM and EEPROM), or flash memory. The memory 1286 is configured to store computer-readable instructions, sensor values, and other persistent software elements.

In this example, the processing unit 1280 is operable to read computer-readable instructions stored on the memory 1286. The computer-readable instructions may adapt the processing unit 1280 to perform the operations or functions described above with respect to FIGS. 1-8. The computer-readable instructions may be provided as a computer-program product, software application, or the like.

For example, the memory 1286 may store a plurality of input profiles, correlating a particular profile of force sensor measurements to a particular input or type of input. Accordingly, when the processing unit 1280 detects a force input to the watch crown or similar input device, the processing unit 1280 may compare the measurements of distinct force sensors to the input profile. If the force measurements match an input profile, the force measurements may be correlated (e.g., associated) with a particular type of input and processed accordingly.

The device 1200 may include a display 1282 that is configured to render visual information generated by the processing unit 1280. The display 1282 may include a liquid-crystal display (LCD), organic light emitting diode (OLED) display, organic electroluminescent (OEL) display, or the like. If the display 1282 is an LCD, the display may also include a backlight component that can be controlled to provide variable levels of display brightness. If the display 1282 is an OLED or OEL type display, the brightness of the display 1282 may be controlled by modifying the electrical signals that are provided to display elements.

The device 1200 may also include a power source 1284, such as a battery, that is configured to provide electrical power to the components of the device 1200. The power source 1284 may include one or more power storage cells that are linked together to provide an internal supply of electrical power. The power source 1284 may be operatively coupled to power management circuitry that is configured to provide appropriate voltage and power levels for individual components or groups of components within the device 1200. The power source 1284, via power management circuitry, may be configured to receive power from an external source, such as an AC power outlet. The power source 1284 may store received power so that the device 1200 may operate without connection to an external power source for an extended period of time, which may range from several hours to several days.

In some embodiments, the device 1200 includes one or more input/output components 1290. The input/output component 1290 is a device that is configured to receive user input. The input/output component 1290 may include, for example, a push button, a touch-activated button, or the like. In some embodiments, the input/output components 1290 may provide a dedicated or primary function, including, for example, a power button, volume buttons, home buttons, scroll wheels, and camera buttons. Generally, a force sensor and a positional sensor may also be classified as an input component. However, for purposes of this illustrative example, the force sensors 1288 and the positional sensors 1294 are depicted as distinct components within the device 1200.

The device 1200 may also include one or more positional sensors 1294 configured to determine a rotational position of a watch crown. The positional sensors 1294 may detect the rotational position of the crown cap by detecting the location of one or more electrodes or other positional indicators on the crown cap. The positional sensors 1294 may operate by capacitive sensing, optical sensing, or similar techniques. The positional sensors 1294 are coupled to the processing unit 1280 which may determine the speed, acceleration, and similar attributes of rotational inputs.

The device 1200 may also include one or more force sensors 1288 in accordance with the embodiments described herein. As previously described, the force sensors 1288 may be configured to receive force input to the watch crown. In some embodiments, the force sensors 1288 may be implemented in a pair of flexible circuits coupled to an insulating substrate. In some embodiments, other force-sensitive structures may be employed, such as a strain gauge, a piezoelectric sensor, a force sensitive resistor, and similar force sensing elements.

The device 1200 may also include a haptic device 1292. The haptic device 1292 may be implemented with a number of devices and technologies, such as an electromechanical actuator. The haptic device 1292 may be controlled by the processing unit 1280, and may be configured to provide haptic feedback to a user interacting with the device 1200.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device comprising:
a display;
a housing at least partially enclosing the display;
a user input control protruding from the housing, the user input control comprising:
a cap configured to receive:
an axial force along a first axis, the axial force configured cause the cap to translate along the first axis;
a rotational force about a second axis, the rotational force configured to cause the cap to rotate about the second axis; and
a lateral force along a third axis, the lateral force configured to cause the cap to shift along the third axis;
a force sensing system configured to detect an applied force, the applied force including at least one of the axial force, the rotational force, or the lateral force; and
a processing unit coupled to the force sensing system, the processing unit configured to modify a graphical output of the display in response to the detected applied force exceeding a threshold.

2. The electronic device of claim 1, wherein:
the user input control is a crown;
the crown further comprises a stud protruding from the housing;
the cap is rotatably coupled to the stud; and
the force sensing system is positioned between the stud and the cap.

3. The electronic device of claim 2, wherein the electronic device further comprises a sealing element formed between the stud and the housing, the sealing element configured to inhibit entry of liquids into the housing.

4. The electronic device of claim 1, wherein:
the cap is further configured to receive an oblique force, the oblique force applied at an angle between the first axis and the third axis; and
the oblique force causes the cap to tilt relative to the housing.

5. The electronic device of claim 4, wherein:
the user input control comprises a stud coupled to the housing;
the cap is movably coupled to the stud;
the force sensing system comprises a compliant material positioned between the cap and the stud; and
in response to the oblique force, a portion of the compliant material is placed under tension.

6. The electronic device of claim 1, wherein:
the housing defines a protruding portion extending from the housing;
the force sensing system further comprises:
a drive electrode coupled to one of the cap or the protruding portion;
a sense electrode coupled to the other of the cap or the protruding portion; and
a compliant material between the drive electrode and the sense electrode, the compliant material configured to be deformed in response to the axial force and the lateral force.

7. The electronic device of claim 1, wherein the cap is constrained relative to the housing such that the cap is rotatable up to less than a full revolution.

8. A wearable electronic device comprising:

a housing comprising a rigid structure extending from an outer surface of the housing;

a display coupled to the housing;

a crown coupled to the rigid structure, the crown comprising:

a crown cap defining a user input surface configured to:

receive a first input comprising a first force along a first axis;

receive a second input comprising a rotational force about the first axis; and receive a third input comprising a second force along a second axis, the second axis perpendicular to the first axis;

a compliant material positioned between the rigid structure and the crown cap; and a force sensing system comprising a force sensor configured to produce a signal in response to a deformation of the compliant material due to any of the first force, the second force, or the rotational force; and a processing system configured to estimate a magnitude of any of the first force, the second force, or the rotational force based on the signal.

9. The wearable electronic device of claim 8, wherein:

the force sensor is one of a plurality of force sensors arranged along the compliant material; and the processing system is configured to estimate a direction of the force.

10. The wearable electronic device of claim 8, further comprising a gasket coupled to the crown cap and the housing, the gasket configured to inhibit entry of contaminants into the housing.

11. The wearable electronic device of claim 8 wherein the rigid structure and the housing are a monolithic piece.

12. The wearable electronic device of claim 8, wherein:

the force sensing system is configured to detect a change in capacitance between a first electrode coupled to the crown cap and a second electrode;

in response to the second input being applied rotationally in a first direction, the force sensing system is configured to detect an increase in capacitance; and in response to the second input being applied rotationally in a second direction, the second direction opposite the first direction, the force sensing system is configured to detect a decrease in capacitance; and the processing system is configured to determine an applied direction of the second force based on the increase or the decrease in capacitance.

13. The wearable electronic device of claim 8, wherein the crown cap is configured to only partially rotate less than a full revolution.

14. The wearable electronic device of claim 8, wherein the compliant material surrounds at least a portion of the rigid structure and fills a cavity defined by the crown cap.

15. A user input control for an electronic device, the user input control comprising:

a base structure;

a crown cap configured to:

rotate about a rotational axis in response to a rotational input;

translate along the rotational axis in response to an actuation input; and laterally translate along an axis perpendicular to the rotational axis and in response to a lateral input;

a compliant material positioned between the base structure and the crown cap, the compliant material configured to:

constrain the rotation of the crown cap to less than a full revolution;

allow motion of the crown cap with respect to the base structure due to the rotational input, the actuation input, and the lateral input; and a force sensing system comprising:

a force sensor arranged within the compliant material, the force sensor configured to detect a change in an electrical property; and a processing system configured to estimate a force magnitude associated with the rotational input, actuation input, and lateral input based on the change in the electrical property.

16. The user input control of claim 15, wherein:

the force sensing system further comprises a circuit configured to detect an applied force; and the compliant material at least partially fills an inside cavity of the crown cap and encompasses the circuit.

17. The user input control of claim 16, wherein:

the base structure defines an opening;

the compliant material is further positioned within the opening; and the circuit passes through the opening.

18. The user input control of claim 15, wherein the compliant material is a gel.

19. The user input control of claim 15, wherein, in response to the lateral input:

a first region of the compliant material is under compression;

a second region of the compliant material is under tension, the second region is different from the first region; and a difference in pressure differential of the compliant material between the first region and the second region causes the crown cap to tilt.

20. The user input control of claim 15, wherein the force sensing system comprises an array of capacitive sensors.

* * * * *